US008928772B2

(12) United States Patent
Pillman et al.

(10) Patent No.: US 8,928,772 B2
(45) Date of Patent: Jan. 6, 2015

(54) CONTROLLING THE SHARPNESS OF A DIGITAL IMAGE

(71) Applicants: Bruce Harold Pillman, Rochester, NY (US); Wei Hao, Superior, CO (US)

(72) Inventors: Bruce Harold Pillman, Rochester, NY (US); Wei Hao, Superior, CO (US)

(73) Assignee: Eastman Kodak Company, Rochester, NY (US)

( * ) Notice: Subject to any disclaimer, the term of this patent is extended or adjusted under 35 U.S.C. 154(b) by 291 days.

(21) Appl. No.: 13/623,934

(22) Filed: Sep. 21, 2012

(65) Prior Publication Data

US 2014/0085507 A1  Mar. 27, 2014

(51) Int. Cl.
*H04N 5/228* (2006.01)

(52) U.S. Cl.
USPC ...................................................... 348/222.1

(58) Field of Classification Search
CPC ..................... G06T 2207/20144; G06T 5/003; G06T 7/0083
USPC ...................................................... 348/222.1
See application file for complete search history.

(56) References Cited

U.S. PATENT DOCUMENTS

| | | |
|---|---|---|
| 3,971,065 A | 7/1976 | Bayer |
| 4,642,678 A | 2/1987 | Cok |
| 4,774,574 A | 9/1988 | Daly et al. |
| 4,975,969 A | 12/1990 | Tal |
| 5,189,511 A | 2/1993 | Parulski et al. |
| 5,493,335 A | 2/1996 | Parulski et al. |
| 5,652,621 A | 7/1997 | Adams, Jr. et al. |
| 5,668,597 A | 9/1997 | Parulski et al. |
| 5,870,103 A | 2/1999 | Luo |
| 6,192,162 B1 | 2/2001 | Hamilton, Jr. et al. |
| 6,282,317 B1 | 8/2001 | Luo et al. |
| 6,292,218 B1 | 9/2001 | Parulski et al. |
| 6,915,011 B2 | 7/2005 | Lou et al. |
| 6,934,056 B2 | 8/2005 | Gindele et al. |
| 7,542,077 B2 | 6/2009 | Miki |
| 7,990,429 B2 * | 8/2011 | Saito .......................... 348/222.1 |
| 8,218,823 B2 | 7/2012 | Wang |
| 8,238,615 B2 | 8/2012 | Cerosaletti et al. |
| 8,290,264 B2 * | 10/2012 | Kim et al. ...................... 382/173 |
| 8,724,919 B2 * | 5/2014 | Pillman et al. ................ 382/254 |
| 2003/0007076 A1 | 1/2003 | Okisu et al. |
| 2007/0024931 A1 | 2/2007 | Compton et al. |
| 2008/0218612 A1 | 9/2008 | Border et al. |
| 2014/0072221 A1 * | 3/2014 | Sakai et al. ..................... 382/173 |
| 2014/0086486 A1 * | 3/2014 | Pillman et al. ................ 382/173 |

OTHER PUBLICATIONS

Jin et al, "Softcopy quality ruler method: Implementation and validation," Proc. SPIE 7242, Image Quality and System Performance VI, 724206 (2009).

(Continued)

*Primary Examiner* — Gary C Vieaux
(74) *Attorney, Agent, or Firm* — Kevin E. Spalding

(57) ABSTRACT

A method for selecting a digital image having controlled sharpness characteristics from a set of candidate digital images of a common scene, each digital image having different sharpness characteristics. An image segmentation process is used to segment each of the candidate digital images into a subject region and a background region. For each candidate digital image the subject and background regions are analyzed to determine an associated subject and background sharpness levels. An output digital image is selected by comparing the determined subject and background sharpness levels to respective aim subject and background sharpness levels. In some embodiments, the aim subject and background sharpness levels are defined in accordance with a scene type classification.

19 Claims, 18 Drawing Sheets

(56) References Cited

OTHER PUBLICATIONS

Jiang et al. "Automatic aesthetic value assessment in photographic images," Proc. IEEE International Conference on Multimedia and Expo, pp. 920-925 (2010).

Li et al., "Aesthetic quality assessment of consumer photos with faces," IEEE International Conference on Image Processing, pp. 3221-3224 (2010).

* cited by examiner

CONTROLLING THE SHARPNESS OF A DIGITAL IMAGE

CROSS-REFERENCE TO RELATED APPLICATIONS

Reference is made to commonly assigned, U.S. patent application Ser. No. 13/623,927, now U.S. Pat. No. 8,724,919, entitled: "Adjusting the sharpness of a digital image", by Pillman et al., which is incorporated herein by reference.

FIELD OF THE INVENTION

This invention pertains to the field of digital photography and more particularly to a method for controlling the sharpness of a digital image.

BACKGROUND OF THE INVENTION

An image of a scene captured with a camera usually exhibits some effects due to a depth-of-field of the optical system where content in the scene is captured with varying sharpness (i.e., focus) depending on the distance from the camera. The desirability of scene content varying in sharpness within an image depends on the type of image. For example, portraits where the background is blurred relative to the subject are typically preferred over portrait images where the background is as sharp as the subject. Conversely, landscape images with the entire scene sharp are usually preferred over landscape images with substantial sharpness variation.

The depth-of-field of the captured image varies with the size of the aperture in the taking lens. This is illustrated in FIGS. 3A and 3B, which show images of the same scene captured with two different aperture settings. FIG. 3A, illustrates a low F/# digital image 190 that was captured using a low F/# (large aperture), providing limited depth of field and blurring the background. FIG. 3B illustrates a high F/# digital image 195 captured using a higher F/# (smaller aperture), increasing the depth of field and producing a background in relatively good focus. (In this example, the low F/# digital image 190 was captured using an F/8 aperture setting and the high F/# digital image 195 was captured using an F/32 aperture setting.)

To control the depth-of-field for different scene types, the aperture setting to the lens can be controlled, either manually or automatically. FIG. 4 illustrates an example of an image capture process 200 that can be used to control the depth-of-field in portraiture applications. In this case, an identify portrait scene step 210 is used to determine that the image being captured is a portrait image. In some cases, this is accomplished by the photographer using appropriate controls on the camera to select a Portrait photography mode. In other cases, this can be done based on analysis of a preview image. When it is determined that a portrait image is being captured, a select maximum aperture step 220 is used to set the optical system to the maximum possible aperture setting (smallest F/#). This provides the minimum depth-of-focus, and therefore provides the maximum amount of blur for the background. Finally a capture archival image step 230 is used to capture and store an image of the scene.

U.S. Patent Application Publication 2003/0007076, to Okisu et al., entitled "Image-processing apparatus and image-quality control method" teaches ways to automatically select one of several scenes modes in a digital camera and adjust image capture settings for capture of an archival image. For a portrait mode an aperture-preferred exposure program and a relatively large aperture is selected. For a landscape mode an aperture-preferred exposure program is also selected, this time with a relatively small aperture.

U.S. Pat. No. 7,990,429 to Saito, entitled "Imaging Device with Blur Enhancement" addresses the problem of enhancing the blur in a captured digital image. Saito teaches segmentation of the image into a first region (subject) and a second region (background), followed by increasing the blur in the background region. In at least one embodiment, the amount of blur applied to the background region is a function of the original blur level in the background region such that the amount of additional blur applied during enhancement is increased for images having larger original blur levels. One limitation of this approach is that background blur is always increased. This does not acknowledge the possibility of an optimum level of background blur. A second limitation is the lack of any tie between estimated sharpness or blur and perceptual quality. While Saito teaches processes related to increasing the blur in an image, he does not teach a relationship between sharpness or blur and perceptual quality.

To capture a scene with a given field-of-view, the focal length of the camera taking lens scales with the size of the capture medium (film in the case of a film camera, or the image sensor in the case of a digital camera). The use of lenses with shorter focal lengths with smaller sensors enables use of smaller apertures for a given photographic condition. Thus, cameras with smaller sensors tend to capture scenes with larger depth-of-field than cameras with larger sensors. This is significant, since digital camera sensor size varies widely, yet people often prefer to have images that have the field-of-view and depth-of-field characteristics typically associated with a moderately large sensor.

There remains a need for a method to control the effective depth-of-field in a captured digital image that is independent of the limitations of the optical system, and to automatically adjust the depth of field characteristics in accordance with scene type.

SUMMARY OF THE INVENTION

The present invention represents a method for providing a digital image having controlled sharpness characteristics, the method being implemented at least in part by a data processing system, comprising:

receiving a set of candidate digital images of a common scene, each digital image having different sharpness characteristics;

applying an image segmentation process to segment each of the candidate digital images into a subject region and a background region;

for each candidate digital image automatically analyzing the subject region to determine an associated subject sharpness level and automatically analyzing the background region to determine an associated background sharpness level;

defining an aim subject sharpness level for the subject region and defining an aim background sharpness level for the background region;

selecting an output digital image having desirable sharpness characteristics from the set of candidate digital images responsive to the aim subject sharpness level and the aim background sharpness level and to the determined subject sharpness level and the determined background sharpness level associated with each candidate digital image; and storing an indication of the output digital image in a processor-accessible memory.

This invention has the advantage that perceptual subject sharpness and perceptual background sharpness are considered when selecting images from a set of similar images.

It has the additional advantage that a digital image having desirable depth-of-field characteristics can be automatically selected based on scene type.

Figure 1:
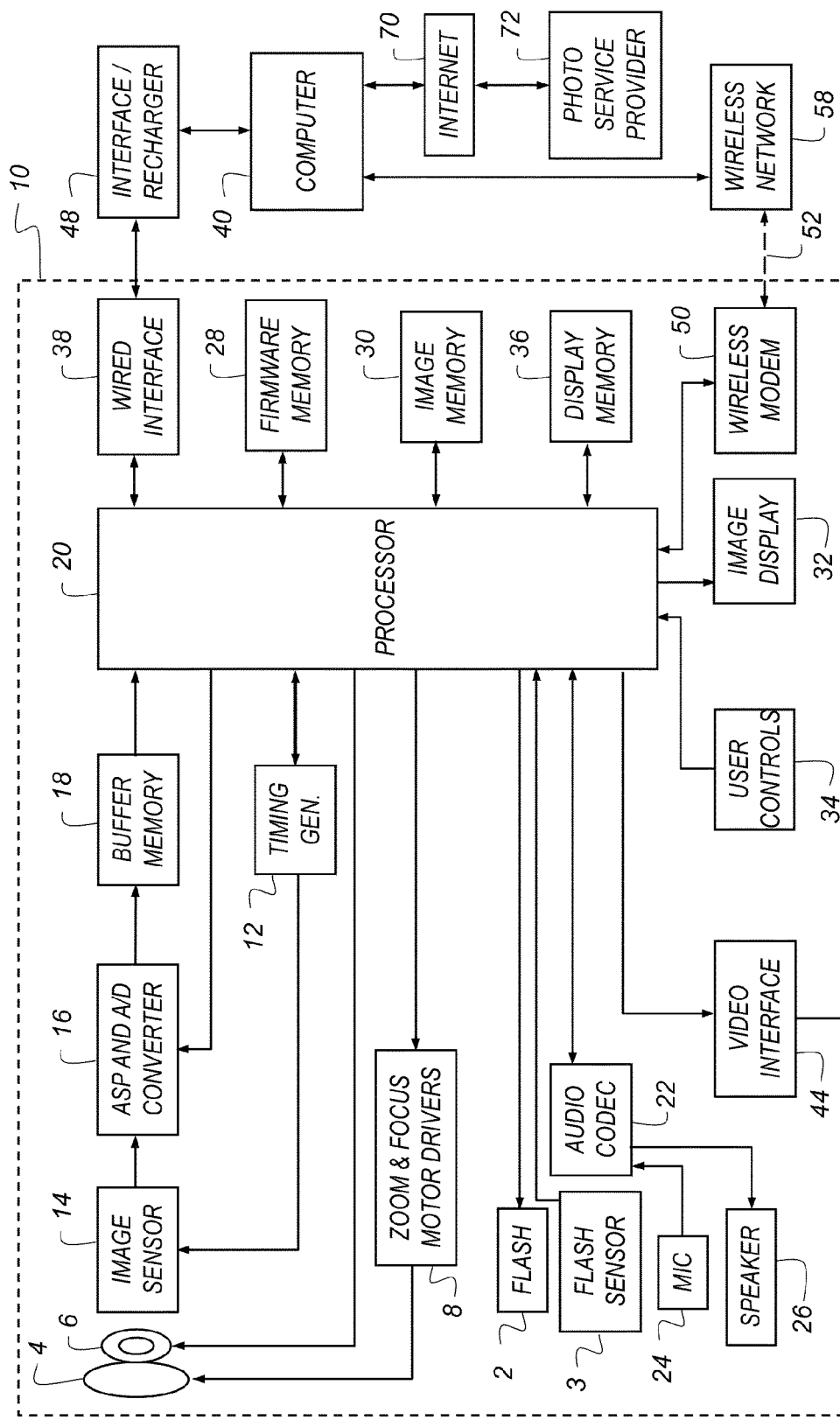
FIG. 1 is a high-level diagram showing the components of a digital camera system.

It is to be understood that the attached drawings are for purposes of illustrating the concepts of the invention and may not be to scale.

DETAILED DESCRIPTION OF THE INVENTION

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, a computer program for performing the method of the present invention can be stored in a computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present invention.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Because digital cameras employing imaging devices and related circuitry for signal capture and processing, and display are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

The following description of a digital camera will be familiar to one skilled in the art. It will be obvious that there are many variations of this embodiment that are possible and are selected to reduce the cost, add features or improve the performance of the camera.

FIG. 1 depicts a block diagram of a digital photography system, including a digital camera 10 in accordance with the present invention. Preferably, the digital camera 10 is a portable battery operated device, small enough to be easily hand-held by a user when capturing and reviewing images. The digital camera 10 produces digital images that are stored as digital image files using image memory 30. The phrase "digital image" or "digital image file", as used herein, refers to any digital image file, such as a digital still image or a digital video file.

In some embodiments, the digital camera 10 captures both motion video images and still images. The digital camera 10 can also include other functions, including, but not limited to, the functions of a digital music player (e.g. an MP3 player), a mobile telephone, a GPS receiver, or a programmable digital assistant (PDA).

The digital camera 10 includes a lens 4 having an adjustable aperture and adjustable shutter 6. In a preferred embodiment, the lens 4 is a zoom lens and is controlled by zoom and focus motor drives 8. The lens 4 focuses light from a scene (not shown) onto an image sensor 14, for example, a single-chip color CCD or CMOS image sensor. The lens 4 is one type optical system for forming an image of the scene on the image sensor 14. In other embodiments, the optical system may use a fixed focal length lens with either variable or fixed focus.

The output of the image sensor 14 is converted to digital form by Analog Signal Processor (ASP) and Analog-to-Digital (A/D) converter 16, and temporarily stored in buffer memory 18. The image data stored in buffer memory 18 is subsequently manipulated by a processor 20, using embedded software programs (e.g. firmware) stored in firmware memory 28. In some embodiments, the software program is permanently stored in firmware memory 28 using a read only memory (ROM). In other embodiments, the firmware memory 28 can be modified by using, for example, Flash EPROM memory. In such embodiments, an external device can update the software programs stored in firmware memory 28 using the wired interface 38 or the wireless modem 50. In such embodiments, the firmware memory 28 can also be used to store image sensor calibration data, user setting selections and other data which must be preserved when the camera is turned off. In some embodiments, the processor 20 includes a program memory (not shown), and the software programs stored in the firmware memory 28 are copied into the program memory before being executed by the processor 20.

It will be understood that the functions of processor 20 can be provided using a single programmable processor or by using multiple programmable processors, including one or more digital signal processor (DSP) devices. Alternatively, the processor 20 can be provided by custom circuitry (e.g., by one or more custom integrated circuits (ICs) designed specifically for use in digital cameras), or by a combination of programmable processor(s) and custom circuits. It will be understood that connectors between the processor 20 from some or all of the various components shown in FIG. 1 can be made using a common data bus. For example, in some embodiments the connection between the processor 20, the buffer memory 18, the image memory 30, and the firmware memory 28 can be made using a common data bus.

The processed images are then stored using the image memory 30. It is understood that the image memory 30 can be any form of memory known to those skilled in the art including, but not limited to, a removable Flash memory card, internal Flash memory chips, magnetic memory, or optical memory. In some embodiments, the image memory 30 can include both internal Flash memory chips and a standard interface to a removable Flash memory card, such as a Secure Digital (SD) card. Alternatively, a different memory card format can be used, such as a micro SD card, Compact Flash (CF) card, MultiMedia Card (MMC), xD card or Memory Stick.

The image sensor 14 is controlled by a timing generator 12, which produces various clocking signals to select rows and pixels and synchronizes the operation of the ASP and A/D converter 16. The image sensor 14 can have, for example, 12.4 megapixels (4088×3040 pixels) in order to provide a still image file of approximately 4000×3000 pixels. To provide a color image, the image sensor is generally overlaid with a color filter array, which provides an image sensor having an array of pixels that include different colored pixels. The different color pixels can be arranged in many different patterns. As one example, the different color pixels can be arranged using the well-known Bayer color filter array, as described in commonly assigned U.S. Pat. No. 3,971,065, "Color imaging array" to Bayer, the disclosure of which is incorporated herein by reference. As a second example, the different color pixels can be arranged as described in commonly assigned U.S. Patent Application Publication 2007/0024931 to Compton and Hamilton, entitled "Image sensor with improved light sensitivity," the disclosure of which is incorporated herein by reference. These examples are not limiting, and many other color patterns may be used.

It will be understood that the image sensor 14, timing generator 12, and ASP and A/D converter 16 can be separately fabricated integrated circuits, or they can be fabricated as a single integrated circuit as is commonly done with CMOS image sensors. In some embodiments, this single integrated circuit can perform some of the other functions shown in FIG. 1, including some of the functions provided by processor 20.

The image sensor 14 is effective when actuated in a first mode by timing generator 12 for providing a motion sequence of lower resolution sensor image data, which is used when capturing video images and also when previewing a still image to be captured, in order to compose the image. This preview mode sensor image data can be provided as HD resolution image data, for example, with 1280×720 pixels, or as VGA resolution image data, for example, with 640×480 pixels, or using other resolutions which have significantly fewer columns and rows of data, compared to the resolution of the image sensor.

The preview mode sensor image data can be provided by combining values of adjacent pixels having the same color, or by eliminating some of the pixel values, or by combining some color pixel values while eliminating other color pixel values. The preview mode image data can be processed as described in commonly assigned U.S. Pat. No. 6,292,218 to Parulski, et al., entitled "Electronic camera for initiating capture of still images while previewing motion images," which is incorporated herein by reference.

The image sensor 14 is also effective when actuated in a second mode by timing generator 12 for providing high resolution still image data. This final mode sensor image data is provided as high resolution output image data, which for scenes having a high illumination level includes all of the pixels of the image sensor, and can be, for example, a 12 megapixel final image data having 4000×3000 pixels. At lower illumination levels, the final sensor image data can be provided by "binning" some number of like-colored pixels on the image sensor, in order to increase the signal level and thus the "ISO speed" of the sensor.

The zoom and focus motor drivers 8 are controlled by control signals supplied by the processor 20, to provide the appropriate focal length setting and to focus the scene onto the image sensor 14. The exposure level of the image sensor 14 is controlled by controlling the f/number and exposure time of the adjustable aperture and adjustable shutter 6, the exposure period of the image sensor 14 via the timing generator 12, and the gain (i.e., ISO speed) setting of the ASP and A/D converter 16. The processor 20 also controls a flash 2 which can illuminate the scene.

The lens 4 of the digital camera 10 can be focused in the first mode by using "through-the-lens" autofocus, as described in commonly-assigned U.S. Pat. No. 5,668,597, entitled "Electronic Camera with Rapid Automatic Focus of an Image upon a Progressive Scan Image Sensor" to Parulski et al., which is incorporated herein by reference. This is accomplished by using the zoom and focus motor drivers 8 to adjust the focus position of the lens 4 to a number of positions ranging between a near focus position to an infinity focus position, while the processor 20 determines the closest focus position which provides a peak sharpness value for a central portion of the image captured by the image sensor 14. The focus distance which corresponds to the closest focus position can then be utilized for several purposes, such as automatically setting an appropriate scene mode, and can be stored as metadata in the image file, along with other lens and camera settings.

The processor 20 produces menus and low resolution color images that are temporarily stored in display memory 36 and are displayed on the image display 32. The image display 32 is typically an active matrix color liquid crystal display (LCD), although other types of displays, such as organic light emitting diode (OLED) displays, can be used. A video interface 44 provides a video output signal from the digital camera 10 to a video display 46, such as a flat panel HDTV display. In preview mode, or video mode, the digital image data from buffer memory 18 is manipulated by processor 20 to form a series of motion preview images that are displayed, typically as color images, on the image display 32. In review mode, the images displayed on the image display 32 are produced using the image data from the digital image files stored in image memory 30.

The graphical user interface displayed on the image display 32 is controlled in response to user input provided by user controls 34. The user controls 34 are used to select various camera modes, such as video capture mode, still capture mode, and review mode, and to initiate the capture of still images, and the recording of motion images. The user controls 34 are also used to set user processing preferences, and to choose between various photography modes based on scene type and taking conditions. In some embodiments, various camera settings may be set automatically in response to analysis of preview image data, audio signals, or external signals such as GPS, weather broadcasts, or other available signals.

In some embodiments, when the digital camera is in a still photography mode the above-described preview mode is initiated when the user partially depresses a shutter button, which is one of the user controls 34, and the still image capture mode is initiated when the user fully depresses the shutter button. The user controls 34 are also used to turn on the camera, control the lens 4, and initiate the picture taking process. User controls 34 typically include some combination of buttons, rocker switches, joysticks, or rotary dials. In some embodiments, some of the user controls 34 are provided by using a touch screen overlay on the image display 32. In other embodiments, the user controls 34 can include a means to receive input from the user or an external device via a tethered, wireless, voice activated, visual or other interface. In other embodiments, additional status displays or images displays can be used.

The camera modes that can be selected using the user controls 34 include a "timer" mode. When the "timer" mode is selected, a short delay (e.g., 10 seconds) occurs after the user fully presses the shutter button, before the processor 20 initiates the capture of a still image.

An audio codec 22 connected to the processor 20 receives an audio signal from a microphone 24 and provides an audio signal to a speaker 26. These components can be used to record and playback an audio track, along with a video sequence or still image. If the digital camera 10 is a multi-function device such as a combination camera and mobile phone, the microphone 24 and the speaker 26 can be used for telephone conversation.

In some embodiments, the speaker 26 can be used as part of the user interface, for example to provide various audible signals which indicate that a user control has been depressed, or that a particular mode has been selected. In some embodiments, the microphone 24, the audio codec 22, and the processor 20 can be used to provide voice recognition, so that the user can provide a user input to the processor 20 by using voice commands, rather than user controls 34. The speaker 26 can also be used to inform the user of an incoming phone call. This can be done using a standard ring tone stored in firmware memory 28, or by using a custom ring-tone downloaded from a wireless network 58 and stored in the image memory 30. In addition, a vibration device (not shown) can be used to provide a silent (e.g., non audible) notification of an incoming phone call.

The processor 20 also provides additional processing of the image data from the image sensor 14, in order to produce rendered sRGB image data which is compressed and stored within a "finished" image file, such as a well-known Exif-JPEG image file, in the image memory 30.

The digital camera 10 can be connected via the wired interface 38 to an interface/recharger 48, which is connected to a computer 40, which can be a desktop computer or portable computer located in a home or office. The wired interface 38 can conform to, for example, the well-known USB 2.0 interface specification. The interface/recharger 48 can provide power via the wired interface 38 to a set of rechargeable batteries (not shown) in the digital camera 10.

The digital camera 10 can include a wireless modem 50, which interfaces over a radio frequency band 52 with the wireless network 58. The wireless modem 50 can use various wireless interface protocols, such as the well-known Bluetooth wireless interface or the well-known 802.11 wireless interface. The computer 40 can upload images via the Internet 70 to a photo service provider 72, such as Shutterfly. Other devices (not shown) can access the images stored by the photo service provider 72.

In alternative embodiments, the wireless modem 50 communicates over a radio frequency (e.g. wireless) link with a mobile phone network (not shown), such as a 3GSM network, which connects with the Internet 70 in order to upload digital image files from the digital camera 10. These digital image files can be provided to the computer 40 or the photo service provider 72.

Figure 2:
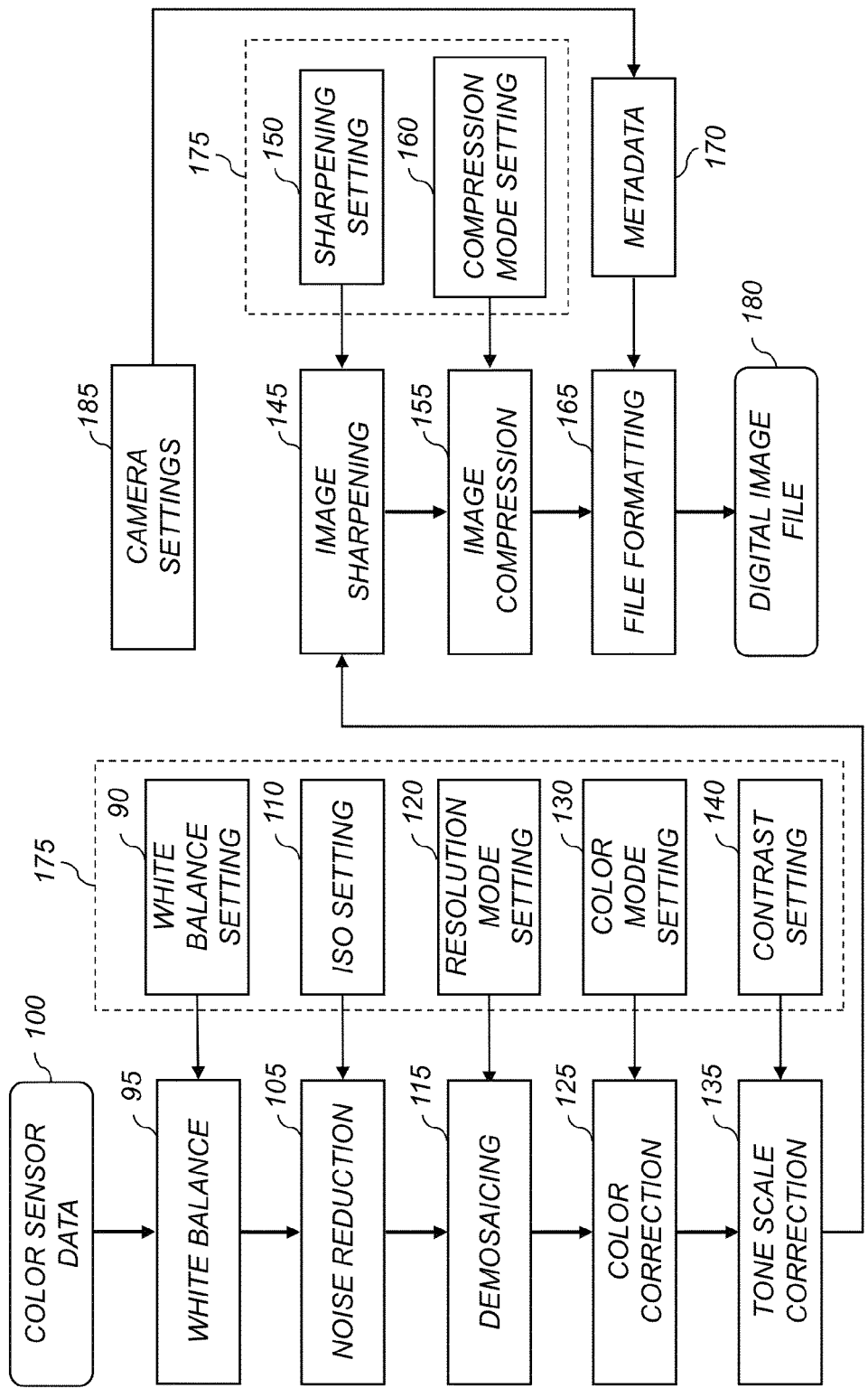
FIG. 2 is a flow diagram depicting typical image processing operations used to process digital images in a digital camera.

FIG. 2 is a flow diagram depicting image processing operations that can be performed by the processor 20 in the digital camera 10 (FIG. 1) in order to process color sensor data 100 from the image sensor 14 output by the ASP and A/D converter 16. In some embodiments, the processing parameters used by the processor 20 to manipulate the color sensor data 100 for a particular digital image are determined by various photography mode settings 175, which are typically associated with photography modes that can be selected via the user controls 34, which enable the user to adjust various camera settings 185 in response to menus displayed on the image display 32.

The color sensor data 100 which has been digitally converted by the ASP and A/D converter 16 is manipulated by a white balance step 95. In some embodiments, this processing can be performed using the methods described in commonly-assigned U.S. Pat. No. 7,542,077 to Miki, entitled "White balance adjustment device and color identification device", the disclosure of which is herein incorporated by reference. The white balance can be adjusted in response to a white balance setting 90, which can be manually set by a user, or which can be automatically set by the camera.

The color image data is then manipulated by a noise reduction step 105 in order to reduce noise from the image sensor 14. In some embodiments, this processing can be performed using the methods described in commonly-assigned U.S. Pat. No. 6,934,056 to Gindele et al., entitled "Noise cleaning and interpolating sparsely populated color digital image using a variable noise cleaning kernel," the disclosure of which is herein incorporated by reference. The level of noise reduction can be adjusted in response to an ISO setting 110, so that more filtering is performed at higher ISO exposure index setting.

The color image data is then manipulated by a demosaicing step 115, in order to provide red, green and blue (RGB) image data values at each pixel location. Algorithms for performing the demosaicing step 115 are commonly known as color filter array (CFA) interpolation algorithms or "deBayering" algorithms. In one embodiment of the present invention, the demosaicing step 115 can use the luminance CFA interpolation method described in commonly-assigned U.S. Pat. No. 5,652,621, entitled "Adaptive color plane interpolation in single sensor color electronic camera," to Adams et al., the disclosure of which is incorporated herein by reference. The demosaicing step 115 can also use the chrominance CFA interpolation method described in commonly-assigned U.S. Pat. No. 4,642,678, entitled "Signal processing method and apparatus for producing interpolated chrominance values in a sampled color image signal", to Cok, the disclosure of which is herein incorporated by reference.

In some embodiments, the user can select between different pixel resolution modes, so that the digital camera can produce a smaller size image file. Multiple pixel resolutions can be provided as described in commonly-assigned U.S. Pat. No. 5,493,335, entitled "Single sensor color camera with user selectable image record size," to Parulski et al., the disclosure of which is herein incorporated by reference. In some embodiments, a resolution mode setting 120 can be selected by the user to be full size (e.g. 3,000×2,000 pixels), medium size (e.g. 1,500×1000 pixels) or small size (750×500 pixels).

The color image data is color corrected in color correction step 125. In some embodiments, the color correction is provided using a 3×3 linear space color correction matrix, as described in commonly-assigned U.S. Pat. No. 5,189,511, entitled "Method and apparatus for improving the color rendition of hardcopy images from electronic cameras" to Parulski, et al., the disclosure of which is incorporated herein by reference. In some embodiments, different user-selectable color modes can be provided by storing different color matrix coefficients in firmware memory 28 of the digital camera 10. For example, four different color modes can be provided, so that the color mode setting 130 is used to select one of the following color correction matrices:

Setting 1 (normal color reproduction)

$$\begin{bmatrix} R_{out} \\ G_{out} \\ B_{out} \end{bmatrix} = \begin{bmatrix} 1.50 & -0.30 & -0.20 \\ -0.40 & 1.80 & -0.40 \\ -0.20 & -0.20 & 1.40 \end{bmatrix} \begin{bmatrix} R_{in} \\ G_{in} \\ B_{in} \end{bmatrix} \quad (1)$$

Setting 2 (saturated color reproduction)

$$\begin{bmatrix} R_{out} \\ G_{out} \\ B_{out} \end{bmatrix} = \begin{bmatrix} 2.00 & -0.60 & -0.40 \\ -0.80 & 2.60 & -0.80 \\ -0.40 & -0.40 & 1.80 \end{bmatrix} \begin{bmatrix} R_{in} \\ G_{in} \\ B_{in} \end{bmatrix} \quad (2)$$

Setting 3 (de-saturated color reproduction)

$$\begin{bmatrix} R_{out} \\ G_{out} \\ B_{out} \end{bmatrix} = \begin{bmatrix} 1.25 & -0.15 & -0.10 \\ -0.20 & 1.40 & -0.20 \\ -0.10 & -0.10 & 1.20 \end{bmatrix} \begin{bmatrix} R_{in} \\ G_{in} \\ B_{in} \end{bmatrix} \quad (3)$$

Setting 4 (monochrome)

$$\begin{bmatrix} R_{out} \\ G_{out} \\ B_{out} \end{bmatrix} = \begin{bmatrix} 0.30 & 0.60 & 0.10 \\ 0.30 & 0.60 & 0.10 \\ 0.30 & 0.60 & 0.10 \end{bmatrix} \begin{bmatrix} R_{in} \\ G_{in} \\ B_{in} \end{bmatrix} \quad (4)$$

In other embodiments, a three-dimensional lookup table can be used to perform the color correction step 125.

The color image data is also manipulated by a tone scale correction step 135. In some embodiments, the tone scale correction step 135 can be performed using a one-dimensional look-up table as described in U.S. Pat. No. 5,189,511, cited earlier. In some embodiments, a plurality of tone scale correction look-up tables is stored in the firmware memory 28 in the digital camera 10. These can include look-up tables which provide a "normal" tone scale correction curve, a "high contrast" tone scale correction curve, and a "low contrast" tone scale correction curve. A user selected contrast setting 140 is used by the processor 20 to determine which of the tone scale correction look-up tables to use when performing the tone scale correction step 135.

The color image data is also manipulated by an image sharpening step 145. In some embodiments, this can be provided using the methods described in commonly-assigned U.S. Pat. No. 6,192,162 entitled "Edge enhancing colored digital images" to Hamilton, et al., the disclosure of which is incorporated herein by reference. In some embodiments, the user can select between various sharpening settings, including a "normal sharpness" setting, a "high sharpness" setting, and a "low sharpness" setting. In this example, the processor 20 uses one of three different edge boost multiplier values, for example 2.0 for "high sharpness", 1.0 for "normal sharpness", and 0.5 for "low sharpness" levels, responsive to a sharpening setting 150 selected by the user of the digital camera 10.

The color image data is also manipulated by an image compression step 155. In some embodiments, the image compression step 155 can be provided using the methods described in commonly-assigned U.S. Pat. No. 4,774,574, entitled "Adaptive block transform image coding method and apparatus" to Daly et al., the disclosure of which is incorporated herein by reference. In some embodiments, the user can select between various compression settings. This can be implemented by storing a plurality of quantization tables, for example, three different tables, in the firmware memory 28 of the digital camera 10. These tables provide different quality levels and average file sizes for the compressed digital image file 180 to be stored in the image memory 30 of the digital camera 10. A user selected compression mode setting 160 is used by the processor 20 to select the particular quantization table to be used for the image compression step 155 for a particular image.

The compressed color image data is stored in a digital image file 180 using a file formatting step 165. The image file can include various metadata 170. Metadata 170 is any type of information that relates to the digital image, such as the model of the camera that captured the image, the size of the image, the date and time the image was captured, and various camera settings, such as the lens focal length, the exposure time and f-number of the lens, and whether or not the camera flash fired. In a preferred embodiment, all of this metadata 170 is stored using standardized tags within the well-known Exif-JPEG still image file format. In a preferred embodiment of the present invention, the metadata 170 includes information about various camera settings 185, including the photography mode settings 175.

The present invention will now be described with reference to FIG. 5, which shows a flow chart for an image enhancement process 300. The processing flow begins with a select digital image step 310, which selects an input digital image for enhancement. This can be done by any method known in the art. In some embodiments, the image enhancement process 300 is performed as part of the image processing applied in the digital camera 10 (FIG. 1) at the time that a digital image is captured. In this case, the select digital image step 310 is automatically performed each time that an image is captured. (In some embodiments, the image enhancement process 300 may only be performed automatically when the digital camera 10 is set to operate in certain image capture modes.)

In some embodiments, the image enhancement process 300 can be used to enhance an input digital image at a later time. In this case, a user interface can be provided, either on the digital camera 10 or in an application running on another system such as a host computer, a photo kiosk or a network server, for performing the select digital image step 310, thereby enabling a user to manually select a particular digital image that is to be enhanced from a collection of digital images. In some embodiments, the select digital image step 310 can be performed automatically by applying an algorithm to determine one or more digital images in a collection of digital images that would benefit from enhancement in accordance with the present invention. It will be obvious to one skilled in the art that many other variations of these approaches can also be used. For example, an automatic algorithm can be used to identify a set of digital images that would benefit from enhancement, and a user interface can be provided to enable a user to select one or more of the identified digital images for processing.

A classify scene type step 320, classifies the input digital image according to its scene type. In the exemplary embodiment of FIG. 5, the input digital image is classified into one of four predefined scene types: Macro, Portrait, Landscape, and Normal. Note that in this context "Portrait" refers to an image of a person (or an image of a representation of a person, such as a mannequin), not to an image taken in a vertical orientation; and "Landscape" refers to a pictorial image of an outdoor scene, not to an image taken in a horizontal orientation. It will be obvious to one skilled in the art that other sets of scene types can be used in various embodiments.

The classify scene type step 320 can use any combination of user interaction and algorithmic analysis in the process of classifying the input digital image. In some embodiments, the scene types are associated with user-selectable photography modes on the digital camera 10 and are automatically classified accordingly. In some embodiments, the input digital image, or metadata associated with the input digital image, is analyzed using an automatic scene type classification algorithm to determine the appropriate scene type. Such scene type classification algorithms are well-known in the art, and any such algorithm can be used in accordance with the present invention.

In some embodiments, a user interface can be provided enabling the user to manually designate an appropriate scene type for the selected input digital image. For example, an image enhancement software application can provide a menu of available scene types from which a user can select the scene type that is most appropriate for the input digital image.

In some cases where the image enhancement process 300 is performed in the digital camera 10 (FIG. 1), the user interface can include user controls 34 on the digital camera 10. In some cases, the user controls 34 are used to select a photography mode, and the scene type is associated with the selected mode. For example, a Macro scene type can be associated with an image captured in a Macro photography mode.

In a preferred embodiment, each of the predefined scene types has an associated set of user preferences for subject and background sharpness. For example, the capture of a scene in a macro mode often limits the depth-of-field because of using a close focus distance relative to the focal length of the lens. In such scenes, a sharply focused subject and a blurred background are generally preferred by a user. Similarly, user preferences for portrait scenes often include a moderately sharp subject and a blurred background. The distinction between macro and portrait scenes is primarily in preference for a somewhat lower subject sharpness in portrait scenes. User preferences for landscape scenes usually favor maximum sharpness, both for a subject and any background. Because many types of scenes don't readily fall into one of the categories already listed, a normal scene class is used in this exemplary embodiment for all other scenes.

For each scene type, processing adapted for enhancement of that scene type is used. Accordingly, a macro processing block 400 is used for processing macro scenes, a portrait processing block 500 is used for portrait scenes, a landscape processing block 600 is used for landscape scenes, and a normal processing block 650 is used for all other scenes. These processing blocks will now be discussed in more detail.

Figure 6:
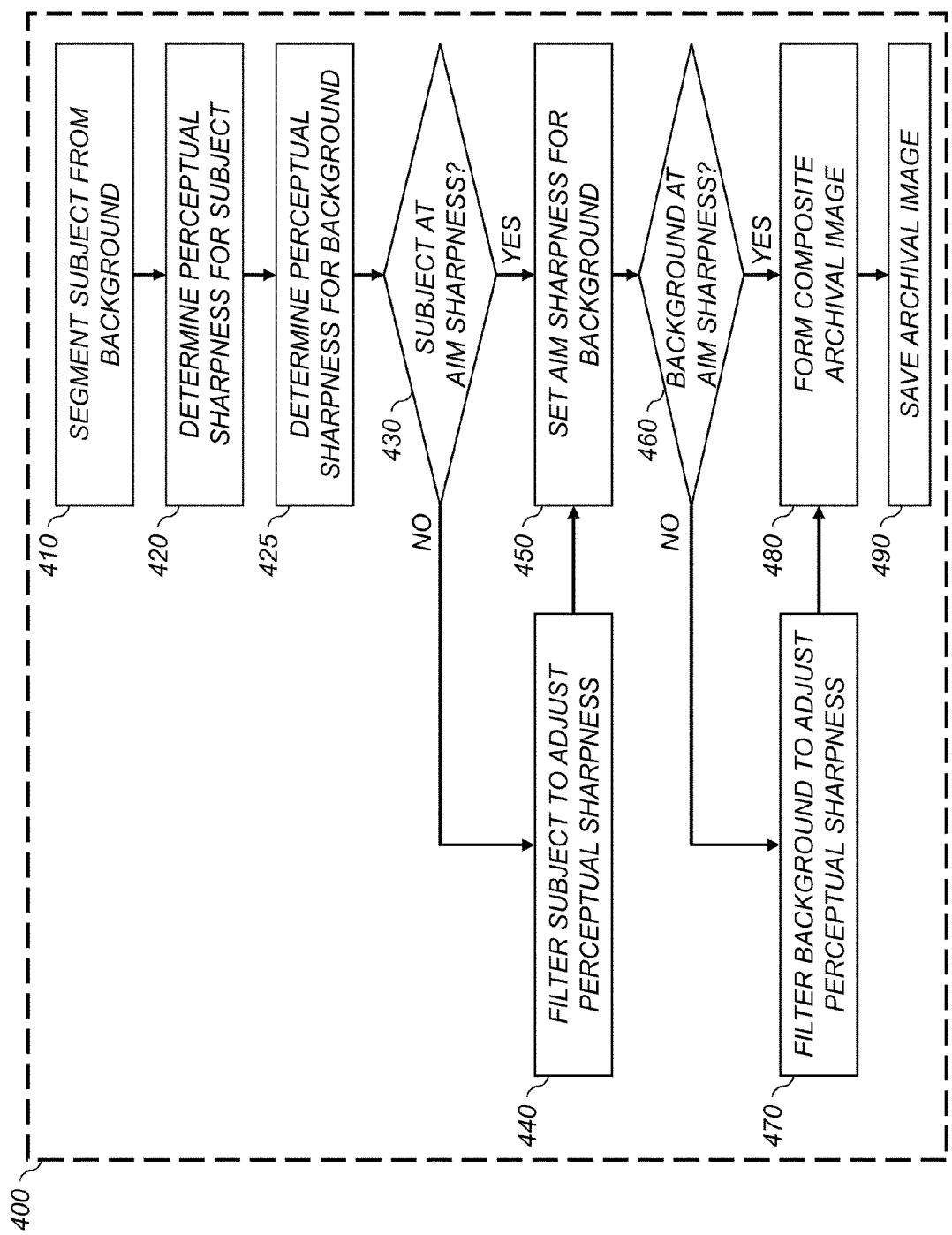
FIG. 6 is a flow diagram illustrating the exemplary processing operations for the macro processing block of FIG. 5 to provide enhanced sharpness characteristics for macro scenes.

FIG. 6 shows additional details of the macro processing block 400 according to an exemplary embodiment. A segment subject from background step 410 is used to automatically analyze the input digital image to segment it into one or more subject regions and a background region. This segmentation process can use any method known in the art. One such method that can be used in accordance with the present invention is described by Luo et al in commonly-assigned U.S. Pat. No. 6,282,317, entitled "Method for Automatic Determination of Main Subjects in Photographic Images," which is incorporated herein by reference. This method extracts multiple regions from the digital image and groups them into larger regions that correspond to physically coherent objects. Saliency features are determined and are combined to provide an estimate of a belief that each region is a main subject.

Other methods for subject detection methods are described by Saito in U.S. Pat. No. 7,990,429, entitled "Imaging Device with Blur Enhancement." This patent makes extensive use of edge extraction, and user interaction, and active illumination to identify subject and background regions in the image.

Further, methods that provide a full range map for the scene through range-finding or other techniques can provide data supporting the segmentation into subject and background regions. One such method is described by Border et al in commonly-assigned U.S. Patent Application Publication 2008/0218612, entitled "Camera Using Multiple Lenses and Image Sensors in a Rangefinder Configuration to Provide a Range Map." Another such method is described in commonly-assigned U.S. Pat. No. 8,218,823 to Wang, entitled "Determining main objects using range information."

After segmentation, a determine perceptual sharpness for subject step 420 is executed to determine a sharpness estimate for the identified subject region. Additional details of the determine perceptual sharpness for subject step 420 will be discussed later with respect to FIG. 10. Similarly, a determine perceptual sharpness for background step 425 is also executed to determine a sharpness estimate for the identified background region. Additional details of the determine perceptual sharpness for background step 425 will be discussed later with respect to FIG. 12. The order of these two steps is arbitrary and can be inverted in some embodiments.

A subject at aim sharpness test 430 is used to compare the determined perceptual subject sharpness with an aim sharpness level corresponding to a user preference for macro scene types. If the perceptual subject sharpness is significantly different from the aim sharpness, a filter subject to adjust perceptual sharpness step 440 is executed to adjust the sharpness level of the subject region accordingly. (It will be understood that some tolerance around the aim sharpness level is allowed; an insignificant deviation from the aim sharpness is not worth the cost of executing the filter subject to adjust perceptual sharpness step 440.)

In various embodiments, the filter subject to adjust perceptual sharpness step 440 can use many different methods to adjust the sharpness of the subject region. In some embodiments, the sharpness can be adjusted by convolving the image with an appropriate sharpening filter to increase the perceptual sharpness (or with an appropriate blur filter to decrease the perceptual sharpness). As is well known in the art, the frequency response, and consequently the amounts of sharpening (or blurring), can be adjusted by appropriate design of the coefficients in the sharpening filter (or blur filter). In some embodiments, a family of sharpening filters and blur filters providing different amounts of sharpening and blurring can be predefined, and an appropriate filter can be selected based on the difference between the aim sharpness and the estimated perceptual sharpness of the subject region.

In some embodiments, the sharpness can be adjusted using unsharp masking, which is a sharpening algorithm that is well known in the art. This algorithm involves convolving an input digital image I(x,y) with a blur filter F(x,y) (i.e., a convolution filter), to get a blurred image B(x,y). The blurred image is subtracted from the input digital image to determine an edge image E(x,y) which can be added to the input digital image to provide a sharpened image S(x,y):

$$S(x, y) = I(x, y) + G \cdot E(x, y) \quad (5)$$
$$= I(x, y) + G \cdot [I(x, y) - B(x, y)]$$
$$= I(x, y) + G \cdot [I(x, y) - I(x, y) * F(x, y)]$$

where G is a gain value, which can be adjusted to provided different amounts of sharpening. For positive gain values the sharpness of the image will be increased, and for negative gain values the sharpness will be decreased. In a preferred embodiment, a look up table can be used to determine the gain value as a function of the difference between the aim sharpness and the estimated perceptual sharpness of the subject region. In some embodiments, the filter coefficients in the blur filter F(x,y) can be adjusted responsive to the desired amount of sharpness adjustment. For example, different sized blur filters can be used depending on the amount of sharpening (or blurring) that is desired.

In some embodiments, the sharpness can be adjusted using the method described in commonly-assigned U.S. Pat. No. 6,192,162 to Hamilton et al., entitled "Edge enhancing colored digital images," which is incorporated herein by reference.

In some embodiments, if more than one subject region is identified, the determine perceptual sharpness for subject step 420 can be applied individually to each of the subject regions. Likewise, the filter subject to adjust perceptual sharpness step 440 can be applied to each subject region that the subject at aim sharpness test 430 determines to be significantly different than the aim sharpness.

Following enhancement of the subject region, a set aim sharpness for background step 450 is executed. In some embodiments, the aim background sharpness is simply set to a predefined aim level corresponding to a user preference for macro scene types as determined by a user preference study. In other embodiments, the aim background sharpness can be adjusted based on the estimated or adjusted sharpness of the subject region. For example, while a simple predefined aim sharpness works well for many scenes, the aim background sharpness can be lowered if the determined subject sharpness is lower than the aim subject sharpness. In some embodiments, the aim background sharpness is defined to provide a predetermined sharpness difference between the subject and the background. (Generally, different predetermined sharpness differences will be associated with the different scene types.)

In some embodiments, the aim background sharpness can also be adjusted responsive to the determined background sharpness. For example, if the background is less sharp than a predefined nominal aim background sharpness, then the determined background sharpness can be used as the aim background sharpness so that background will be left unchanged and no attempt will be made to sharpen the background.

After setting the aim background sharpness, a background at aim blur sharpness 460 is used to compare the determined perceptual sharpness of the background region with an aim background sharpness level. If the determined perceptual blur for the background is significantly different from the aim background sharpness level, a filter background to adjust perceptual sharpness step 470 is executed to adjust the sharpness of the background region. The filter background to adjust perceptual sharpness step 470 can increase or decrease the amount of sharpness as appropriate.

The adjust perceptual sharpness step 470 can use any appropriate method known in the art for adjusting a sharpness level of an image. In some embodiments, the background can be convolved with a blur filter (or a sharpening filter) to increase (or decrease) the amount of blur. In some embodiments, a family of blur filters (and sharpening filters) providing different amounts of blur (or sharpening) can be predefined, and an appropriate filter can be selected based on the difference between the aim sharpness and the estimated perceptual sharpness of the subject region. In some embodiments, the amount of sharpness can be adjusted using the unsharp masking approach that was discussed above with respect to Eq. (5), where negative gain values will decrease the perceptual sharpness (i.e., increase the perceptual blur) of the image, and positive gain values will increase the perceptual sharpness (i.e., decrease the perceptual blur) of the image. Another exemplary embodiment of the adjust perceptual sharpness step 470 will be discussed in more detail later with respect to FIG. 16.

If either the subject region or the background region has been altered, a form composite archival image step 480 is executed to combine the modified image regions. This step can use a variety of different methods to form the composite image. In some embodiments, it can use the method described in commonly-assigned U.S. Pat. No. 5,870,103, entitled "Method for Creating Realistic-Looking Composite Images" to Luo, which is incorporated herein by reference. In an alternative embodiment, the adjustment of one or both of the subject and background regions may be performed in place with suitable masking In some embodiments, the unsharp masking approach can be used for both adjusting the sharpness of the subject and adjusting the sharpness of the background. In this case, the filter subject to adjust perceptual sharpness step 440, the filter background to adjust perceptual sharpness step 470 and the form composite archival image step 480 can all be combined into a simple operation by allowing the gain value G to vary as a function of position. The gain value in the subject region(s) can be set to a value appropriate to provide the desired level of sharpness adjustment and the gain value in the background region can be set to a value appropriate to provide the desired level of sharpness adjustment. In some embodiments, a gain mask G(x,y) can be formed in accordance with the image regions, and can be filtered to smoothly transition the sharpening effect at the boundaries between the subject and background regions. In such a combined implementation, those skilled in the art will appreciate that care should be taken at the boundaries to limit bleeding of subject pixels into background pixels, or vice versa.

After forming the final archival image, a save archival image step 490 is executed to store the archival image in a processor-accessible memory. This will normally include image compression and file formatting steps to save the image within a "finished" image file, such as a well-known Exif-JPEG image file.

Figure 7:
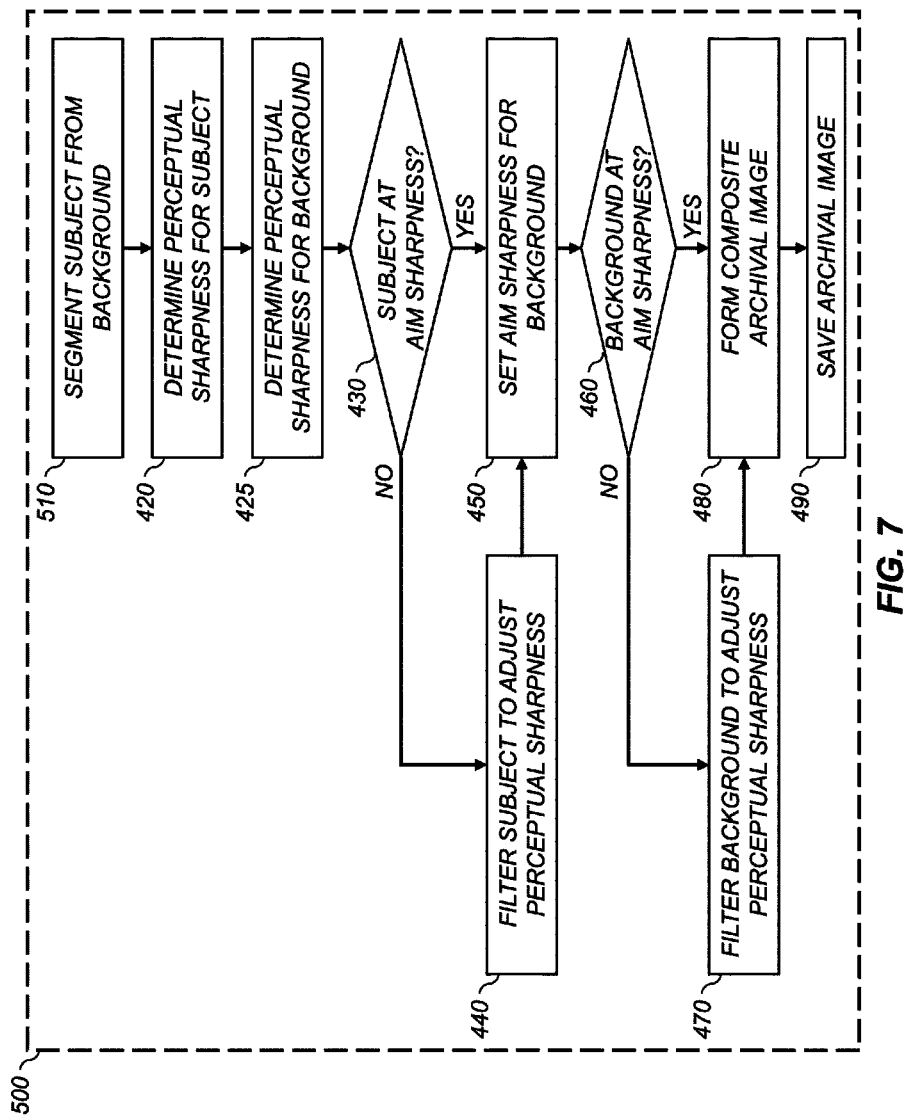
FIG. 7 is a flow diagram illustrating the exemplary processing operations for the portrait processing block of FIG. 5 to provide enhanced sharpness characteristics for portrait scenes.

Referring to FIG. 7, an exemplary embodiment of the portrait processing block 500 of FIG. 5 will be described in more detail. The overall flow for the portrait processing block 500 is analogous to that of the macro processing block 400 as previously described relative to FIG. 6. First, a segment subject from background step 510 is first used to segment the input digital image into one or more subject regions and a background region. The segment subject from background step 510 may be different from the segment subject from background step 410 of FIG. 6, because in this case the segmentation process can be tailored for segmentation of a person rather than a generic object. For example, a face or person detector can be used rather than more general object segmentation approaches. Face and person detectors are well-known in the image processing art, and any appropriate method can be used in accordance with the present invention.

The remaining steps in FIG. 7 will be largely the same as the corresponding steps discussed relative to FIG. 6, although the user-preferred aim sharpness level for the subject regions and aim sharpness level for the background region will be optimized for portraiture photography. For example, in a preferred embodiment, the aim subject sharpness is lower for a portrait scene type than for a macro scene type. This can provide a "soft focus" look to reduce the visibility of skin blemishes.

Figure 8:
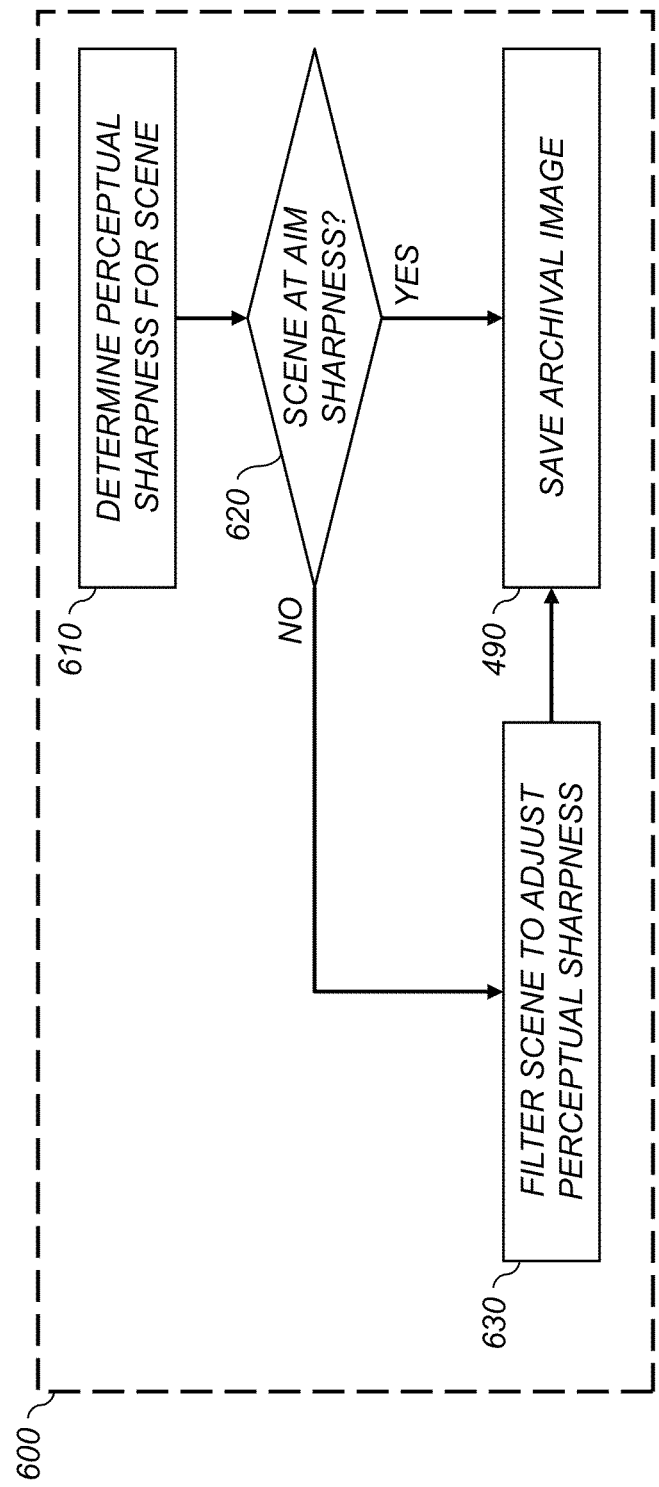
FIG. 8 is a flow diagram illustrating the exemplary processing operations for the landscape processing block of FIG. 5 to provide enhanced sharpness characteristics for landscape scenes.

Referring to FIG. 8, an exemplary embodiment for the landscape processing block 600 is shown. In this embodiment, the subject is effectively the entire image, so no image segmentation is required. Accordingly, the processing begins with a determine perceptual sharpness for scene step 610. The determine perceptual sharpness for scene step 610 is conceptually similar to the determine perceptual sharpness for subject step 420 in FIG. 6, although it is applied to the entire image rather than to only they subject region.

After the estimate perceptual sharpness for scene step 610, a scene at aim sharpness test 620 is executed which compares the determined perceptual sharpness of the scene to an aim sharpness value. This is similar to the subject at aim sharpness test 430 in FIG. 6, although the aim sharpness for a landscape scene can be different from the aim sharpness for other scene types.

If the scene at aim sharpness test 620 determines that the estimated perceptual sharpness is significantly different from the aim sharpness, a filter scene to adjust perceptual sharpness step 630 is executed to adjust the image sharpness. This step is similar to the filter subject to adjust perceptual sharpness step 440 in FIG. 6. Finally, save archival image step 490 is used to save the enhanced image. This step has been discussed earlier with reference to FIG. 6.

Figure 9:
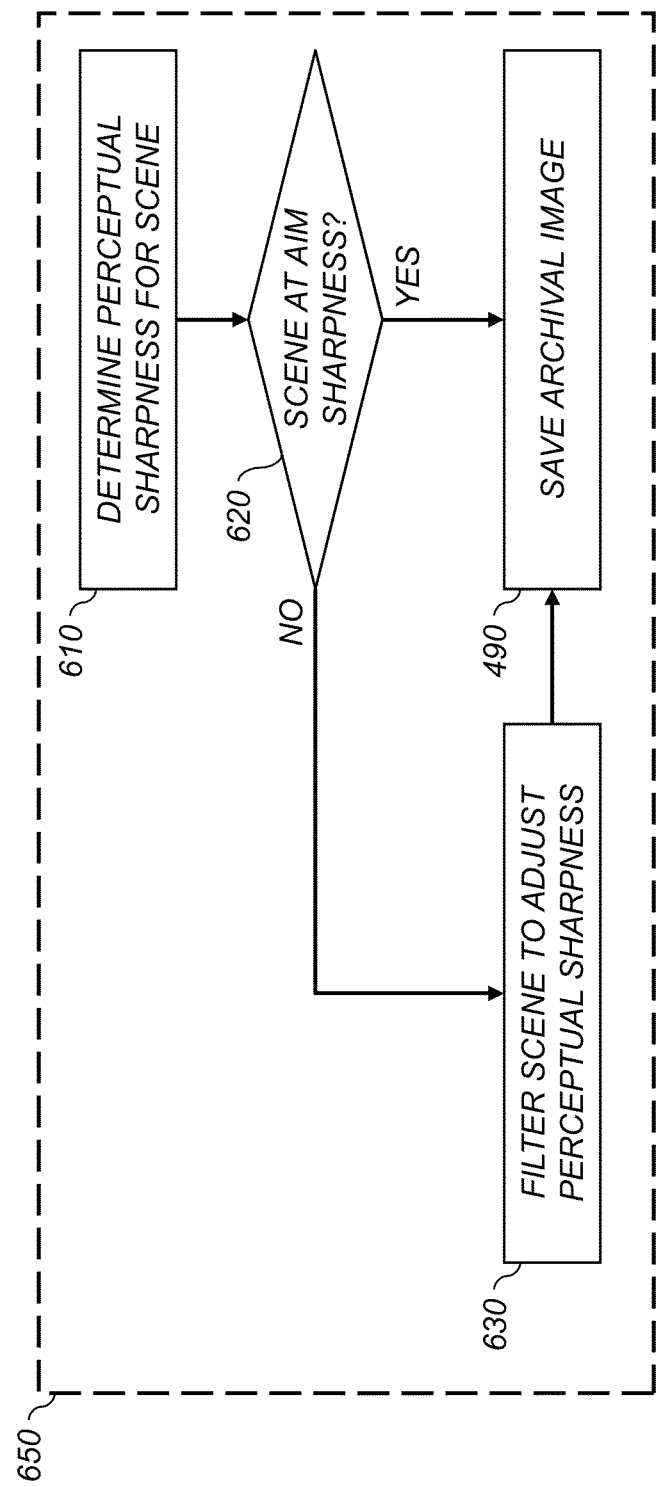
FIG. 9 is a flow diagram illustrating the exemplary processing operations for the normal processing block of FIG. 5 to provide enhanced sharpness characteristics for normal scenes.

Referring to FIG. 9, an exemplary embodiment for the normal processing block 650 is shown. This process must be highly robust and tolerant of a large range of scenes. Therefore, in the illustrated embodiment, no image segmentation is performed, although in some embodiments image segmentation can be optionally applied. The steps in the illustrated embodiment of the normal processing block 650 are identical to those of the landscape processing block 600 in FIG. 8, although the aim sharpness level for an unknown "normal" scene can be different from the aim sharpness level for a landscape scene.

Figure 10:
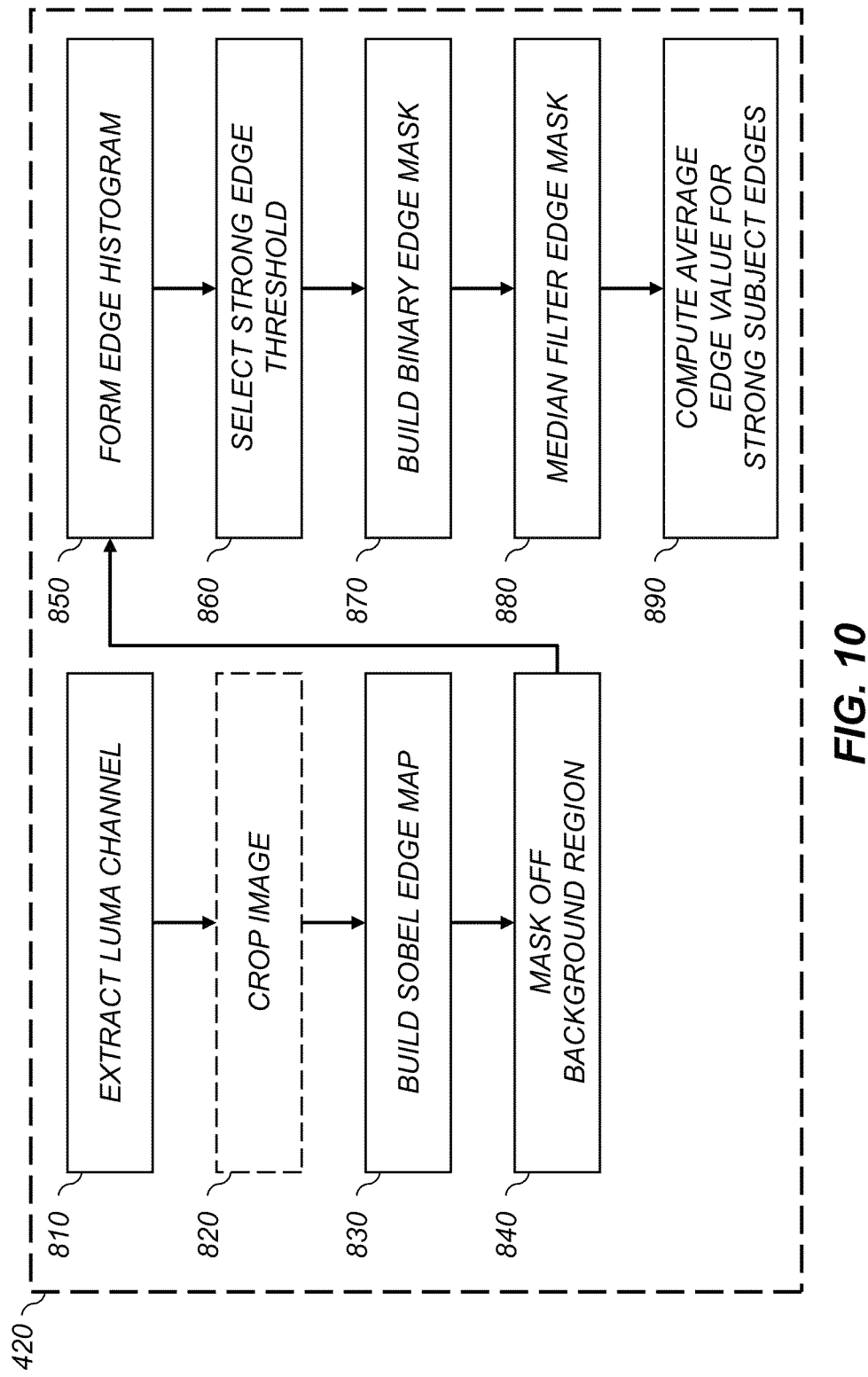
FIG. 10 is a flow diagram showing additional details of the determine perceptual sharpness for subject step in FIG. 6 according to an exemplary embodiment.

Referring to FIG. 10, the determine perceptual sharpness for subject step 420 of FIG. 6 is now discussed in more detail with regard to an exemplary embodiment. An extract luma channel step 810 is executed to extract a luma cannel (i.e., a luminance channel) from the input digital image. In some cases the input digital image is in a luma-chroma color space such as the well-known $YC_rC_b$ color space. In this case, the extract luma channel step 810 simply selects the luma channel of the image. For cases where the input digital image is an RGB image, then a luma channel can be computed by performing a combination of the red, green and blue color channels as is well-known in the art. Alternatively, the green channel can be selected as an approximation to a luma channel. If the input digital image is a grayscale image (i.e., a single channel image), the extract luma channel step 810 is unnecessary. If a color image is input, it is desirable to select a single channel for sharpness analysis.

An optional crop image step 820 is used to crop the input digital image remove borders from the image and focus the sharpness analysis on a central portion of the image. Preferably, the width of the border region that is cropped off is between 1 and 20 percent of the image height. The subject mask is a logical image of the same size as the input digital image; it is cropped in the same way that the input digital image is cropped to maintain spatial correspondence with it.

A build edge map step 830 builds an edge map for the cropped image. Preferably, the edge map is a Sobel edge map determined by convolving the input digital image once with a horizontal gradient kernel:

$$S_h = \begin{bmatrix} 1 & 0 & -1 \\ 2 & 0 & -2 \\ 1 & 0 & -1 \end{bmatrix} \quad (6)$$

and once with a vertical gradient kernel:

$$S_v = \begin{bmatrix} 1 & 2 & 1 \\ 0 & 0 & 0 \\ -1 & -2 & -1 \end{bmatrix} \quad (7)$$

to provide two directional edge maps. The absolute value of each direction edge map is summed to provide an overall edge map.

After computing the edge map, a mask off background region step 840 is used to eliminate the background region from further analysis. A form edge histogram step 850 forms an edge histogram by collecting all edge values from the subject region and building a histogram of the edge values.

A select strong edge threshold step 860 selects an appropriate strong edge threshold value that can be used to identify strong edges in the image. In a preferred embodiment, the select strong edge threshold step 860 indexes into the edge histogram and selects an edge value corresponding to a predefined percentile of the edge values to be used as the strong edge threshold. In a preferred embodiment, the $90^{th}$ percentile is used, although in various embodiments the percentile can be adjusted to balance robustness and sensitivity.

A build binary edge mask step 870 creates a binary edge mask that includes only those pixels with edge values that are greater than or equal to the strong edge threshold. A median filter edge mask step 880 applies a median filter to reduce noise in the binary edge mask. In a preferred embodiment, a 3×3 median filter is used, although other sizes are also effective, especially in helping reduce sensitivity to speckle noise in the input digital image.

A compute average edge value for strong subject edges step 890 determines the perceptual sharpness value by applying the binary edge mask to the edge map and computing the arithmetic mean edge value for all the strong edge pixels. In some embodiments, the average edge value can be multiplied by a predefined scale factor to control the data range for the perceptual sharpness estimation. In a preferred embodiment, the average edge value is scaled by a scale factor of 1/500 to provide a perceptual sharpness value that will generally fall within the range from zero to one.

In some embodiments, various parameters used in the determine perceptual sharpness for subject step, such as the percentile used for setting the strong edge threshold and the size of the median filter can vary with the scene type (e.g., macro scenes vs. portrait scenes).

Figure 11:
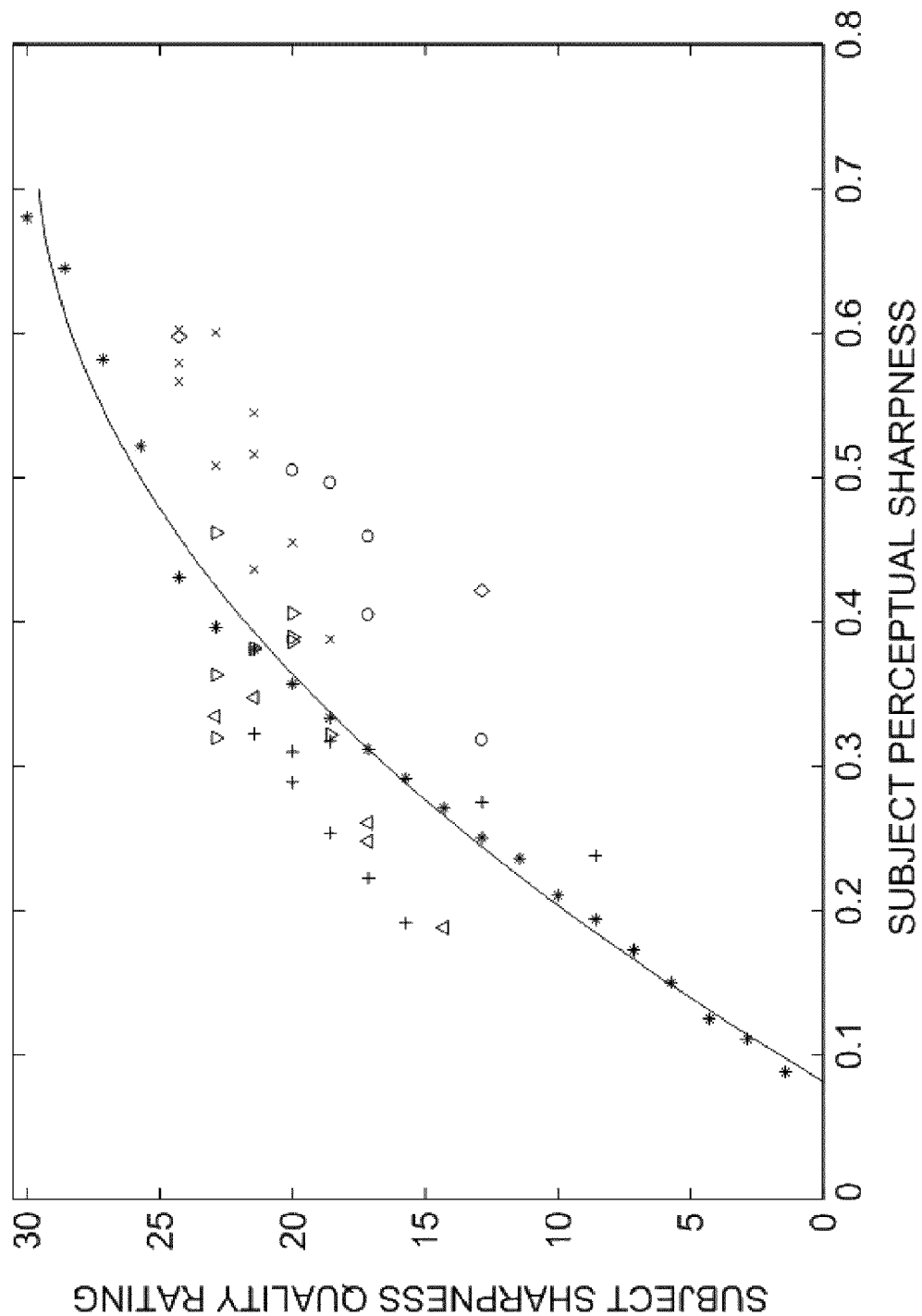
FIG. 11 is a plot illustrating a relationship between computed subject perceptual sharpness and a subject sharpness quality rating.

Referring to FIG. 11, values of subject sharpness quality rating for several series of images are plotted vs. estimated subject perceptual sharpness. The estimated subject perceptual sharpness data for this plot was determined by performing the determine perceptual sharpness for subject step 420 on several series of images; each series of images is denoted by a different symbol in the plot. The star symbols correspond to a series of 21 images generated to simulate evenly spaced perceptual quality differences following the process outlined in the article by Jin et al, entitled "Softcopy quality ruler method: Implementation and validation", (Proc. SPIE 7242, Image Quality and System Performance VI, 724206, 2009). The other series of images were captured of different scenes by varying exposure settings (exposure time and F/#), and hence subject sharpness. The subject sharpness quality ratings were subjectively determined by comparing the subject region of the captured images with the softcopy ruler. A quality rating of 30 corresponds to an excellent quality while a quality of 0 corresponds to a very poor image, usually considered not worth keeping. This graph demonstrates that the described method for estimating the subject perceptual sharpness is well correlated with human perception.

Figure 12:
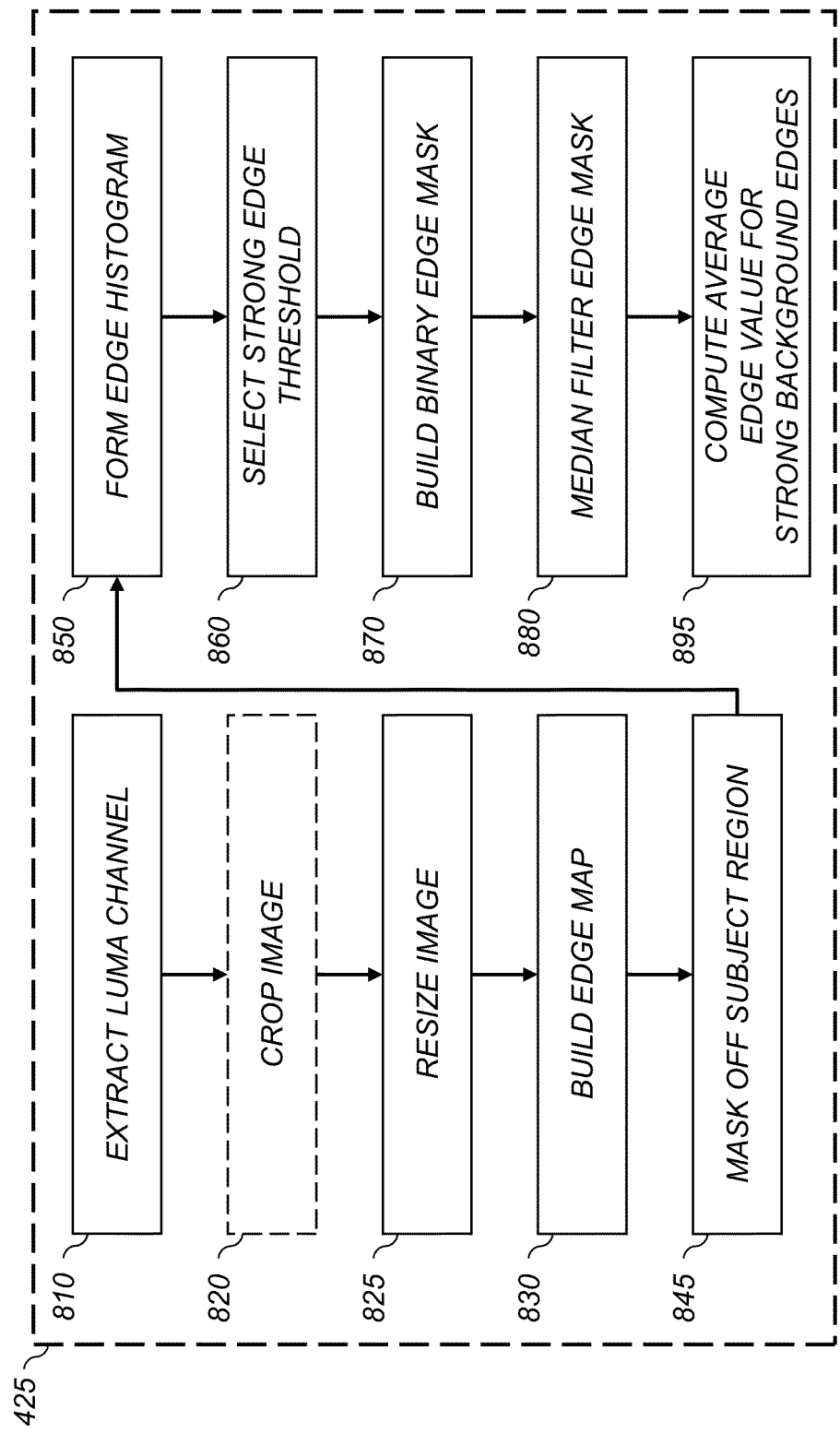
FIG. 12 is a flow diagram showing additional details of the determine perceptual sharpness for background step in FIG. 6 according to an exemplary embodiment.

Referring to FIG. 12, the determine perceptual sharpness for background step 425 of FIG. 6 is now described in more detail according to an exemplary embodiment. This process is analogous to that described relative to FIG. 10 for the determine perceptual sharpness for subject step 420. As in FIG. 10, the extract luma channel 810 is used to extract a luminance channel for processing, and the crop image step 820 is used to remove borders from the image and focus the sharpness analysis on a central portion of the image.

A resize image step 825 is performed to resize the image and the corresponding subject mask to a lower spatial resolution. In a preferred embodiment, the shorter dimension of the image (and the subject mask) is resized to 480 pixels, although other sizes can be effective as well. This step is important for estimating background sharpness effectively. Subject sharpness is primarily dependent on high frequency detail in an image. Background sharpness is also related to detail or modulation, but typically at much lower spatial frequencies. Resizing the image to a lower resolution provides for better differentiation between different levels of background sharpness. In a preferred embodiment, the resizing is done using nearest-neighbor re-sampling with no pre-filtering.

The build edge map step 830 and following steps are analogous to the corresponding steps in FIG. 10, although some different parameters may be used. In this case, a mask off subject region step 845 is used to eliminate the subject region from further analysis. In a preferred embodiment, the percentile used for setting the strong edge threshold in the select strong edge threshold step 860 is 50%. This includes a larger proportion of the background region in the determination of the estimated perceptual sharpness. This is particularly useful to improve robustness to flaws in segmentation. If portions of the subject are included in the background region, the edge detail from the subject region will tend to bias the estimation of background sharpness. Including more of the background region in the average will reduce this bias. Other techniques for outlier rejection, such as a trimmed mean, further improve this robustness.

A compute average edge value for strong background edges step 895 determines the perceptual sharpness value for the background region by applying the binary edge mask to the edge map and computing the arithmetic mean edge value for all the strong edge pixels.

It is well known in the prior art that sharpness measures tend to respond to scene content, not simply to focus variations. An advantage of the present approach for estimating perceptual background sharpness is that the approach is less concerned with "focus" and more concerned with evaluating the level of distracting modulation. If a portrait image is captured with a background having less a distracting texture, then a lower level of background sharpness would be reported even if the background is in focus. The lower level of perceptual sharpness would be subjectively appropriate, even if the degree of focus is unchanged.

Figure 13:
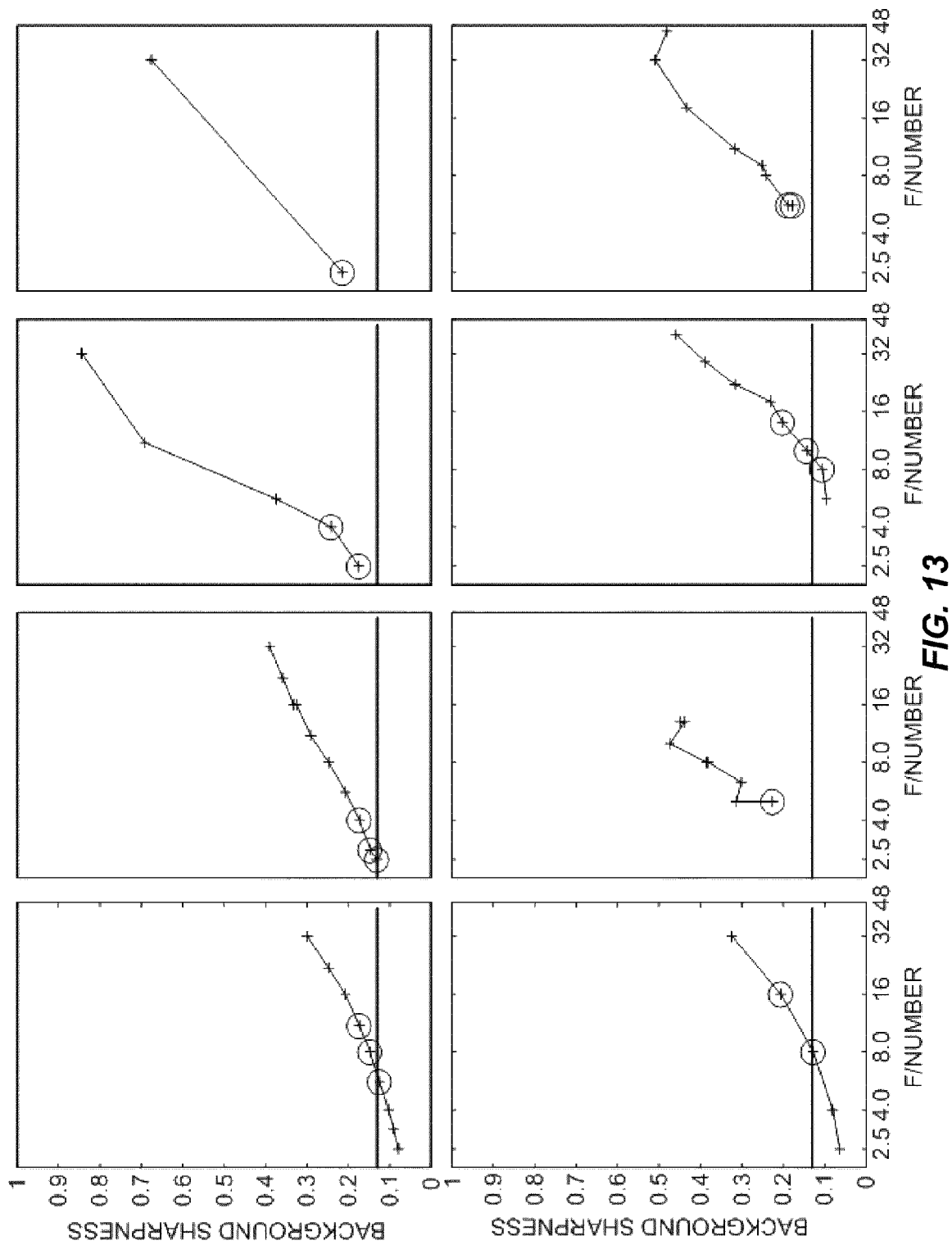
FIG. 13 is a set of graphs illustrating the relationship between F/# and background sharpness for different scenes.

Referring to FIG. 13, eight plots are shown illustrating experimental results for the described method for estimating the perceptual background sharpness. Each plot shows the background sharpness estimated for a series of images captured with a series of F/#s. Most of the series begin with the lowest F/# practical for that scene, providing the largest degree of background blur, and consequently the lowest background sharpness. As the F/# increases, the depth of field increases, and the background sharpness increases accordingly. For each series, the image(s) determined to have a preferred level of background sharpness for a portrait image are circled. Overall, a perceptual background sharpness of approximately 0.14 is preferred, highlighted by the horizontal line in each plot. Because the background blur preference drops by approximately 1 quality category as the background sharpness varies from aim by about ±0.06, a tolerance of ±0.06 can be used in the background aim sharpness test 460.

Figure 14:
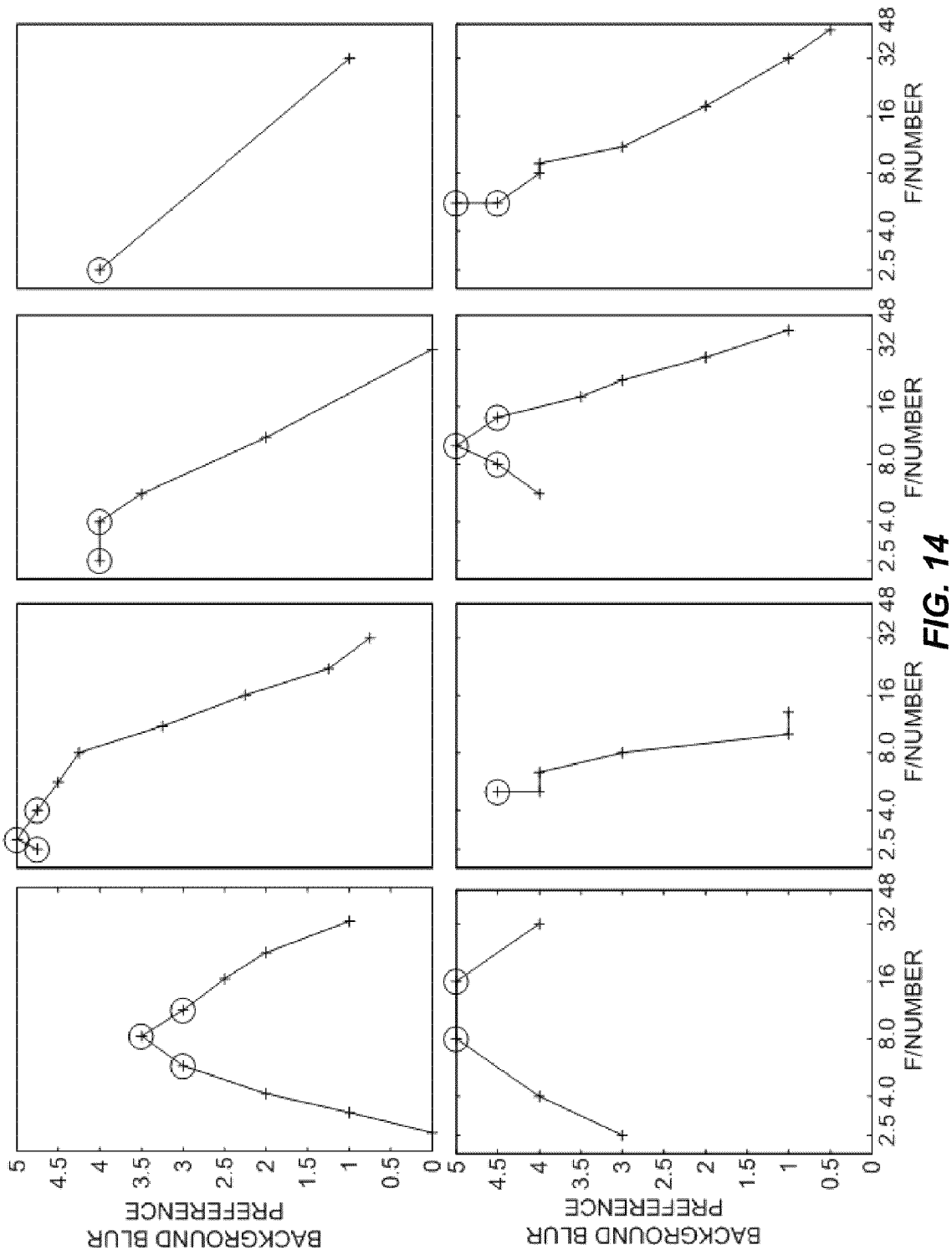
FIG. 14 is a set of graphs illustrating the relationship between F/# and preferred degree of background sharpness for different scenes.

Referring to FIG. 14, the same eight series of images are shown, but this time with a subjective background blur preference shown on the y-axis. That is, for each image, a subjective preference category was selected, with "5" denoting a very "good" level of background blur. A background blur preference of "0" denotes a "poor" level of background blur (either too soft and featureless, or too sharp, with insufficient differentiation between the subject and the background). As in FIG. 13, the images with a preferred level of background sharpness are circled. Qualitatively, this validates the choices of preferred images in each sequence (the images with the highest quality background blur are the preferred images).

Figure 15:
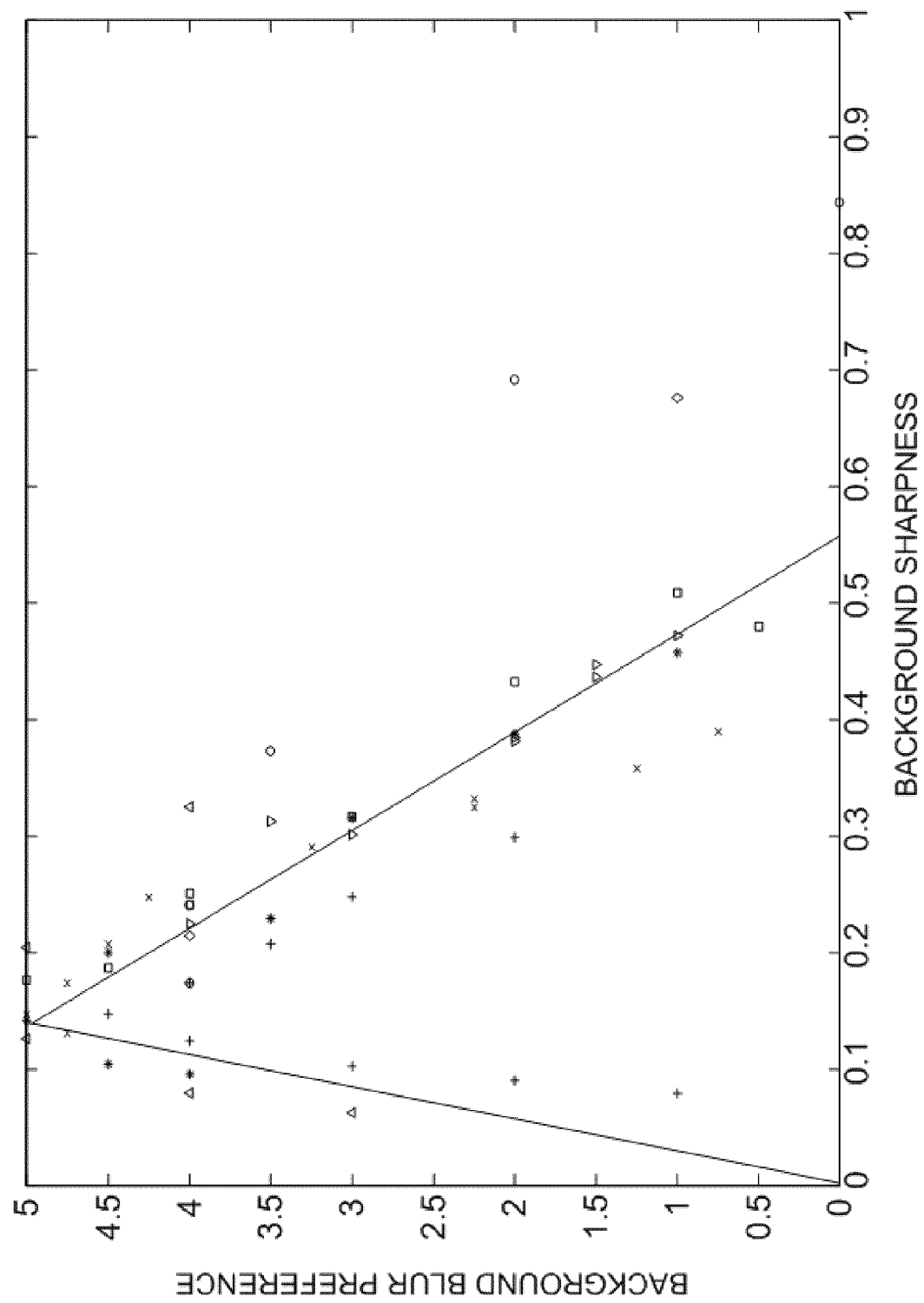
FIG. 15 is a graph illustrating the relationship between background sharpness and subjective background blur preference for portrait scenes.

Referring to FIG. 15, the data from FIGS. 13 and 14 are combined, plotting the subjective background blur preference for each image vs. the estimated perceptual background sharpness for each image. The relationship between subjective quality and estimated background sharpness is nonlinear, peaking near 0.14.

The plots shown in FIGS. 13-15 were determined from a user study for a series of portrait images. Therefore, the aim background sharpness values of 0.14 is appropriate for use by the background at aim sharpness test 460 in the portrait processing block 500 of FIG. 7. A similar user preference study can be used to define the aim subject and background sharpness values for each of the different scene types.

Figure 16:
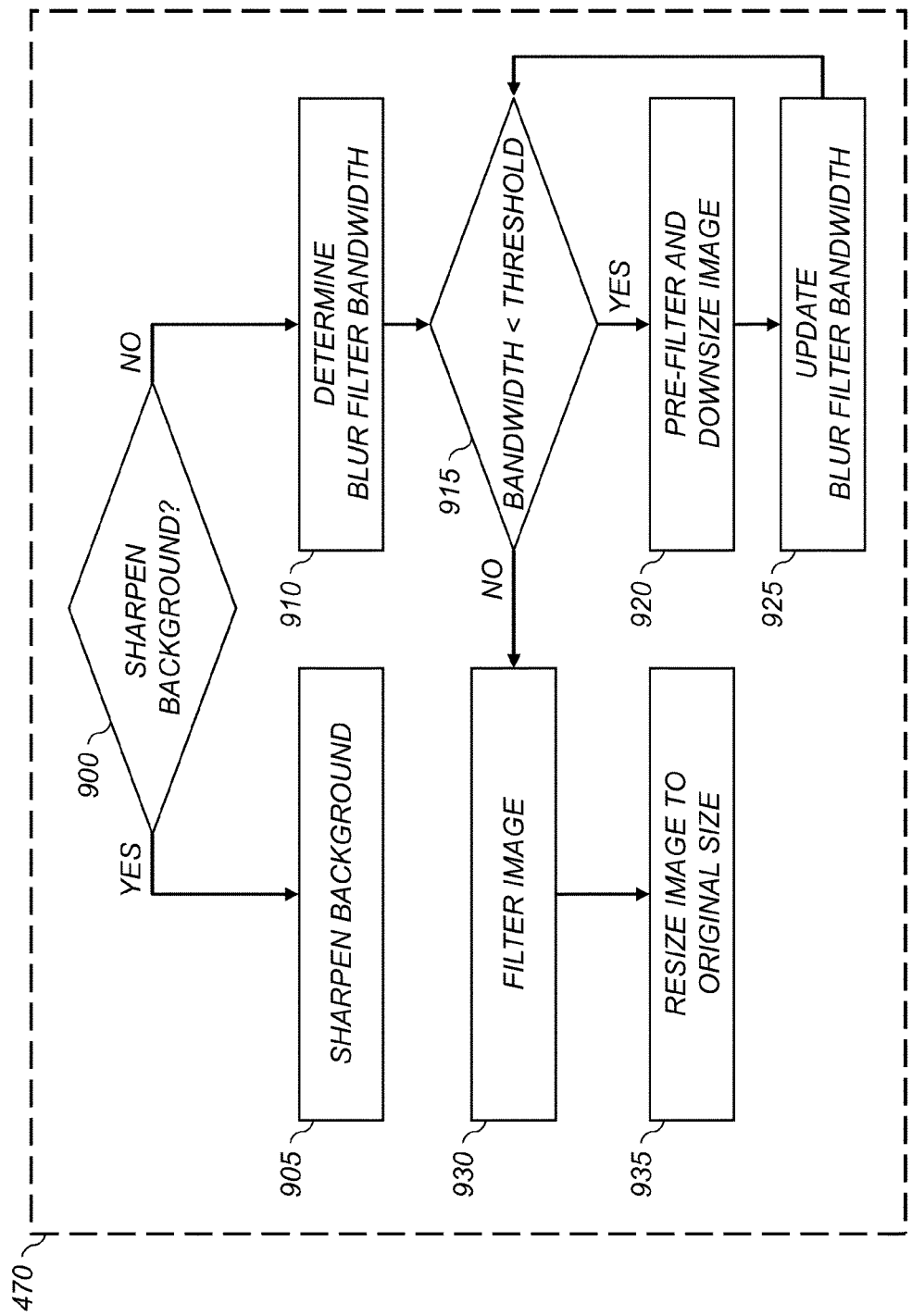
FIG. 16 is a flow diagram showing additional details of the filter background to adjust perceptual sharpness step in FIG. 6 according to an exemplary embodiment.

Referring to FIG. 16, the filter background to adjust perceptual sharpness step 470 of FIG. 6 is now described in more detail according to an exemplary embodiment. In many cases, it will be desirable to make a large reduction in the background sharpness by blurring the background to better differentiate the subject from the background for scene types such as portrait scenes or macro scenes. One challenge that this presents is that to introduce a large amount of blur by filter the image directly would require a very large low-pass filter, which can be computationally slow to apply. This embodiment is based on using an iterative pyramid approach to reduce the image size until the desired amount of blur can be achieved using a reasonably sized low-pass filter.

A sharpen background test 900 is used to determine whether the background region needs to be sharpened or blurred based on the determined perceptual sharpness for the background and the aim background sharpness. If the aim background sharpness is higher than the determined perceptual sharpness, then a sharpen background step 905 is used to sharpen the background image. In some embodiments, the sharpen background step 905 sharpens the background using an unsharp masking algorithm as has been described earlier. For cases where the determined perceptual sharpness for the background is significantly less than the aim background sharpness, it may not be possible to restore the desired level of sharpness without introducing artifacts. In such cases, it may be better to leave the background unchanged, or implement only a partial correction.

If the sharpen background test 900 determines that aim background sharpness is less than the determined perceptual sharpness so that the background needs to be blurred, a determine blur filter bandwidth step 910 determines that bandwidth of the blur filter that would be required to provide the desired amount of image blurring based on the aim background sharpness and the determined perceptual sharpness.

In some embodiments the blur filter bandwidth is determined by a binary search, applying a nominal filter, testing the resulting background sharpness, then adjusting the filter bandwidth accordingly (higher bandwidth if background sharpness is too low, lower bandwidth if the background sharpness is too high). This approach is computationally intensive, but is assured to produce a background sharpness in the desired range. Those skilled in the art will appreciate that many techniques can be applied to speed the search.

A bandwidth test 915 is used to compare the determined bandwidth to a predefined bandwidth threshold associated with the largest practical blur filter size. If the bandwidth is less than the threshold, then a pre-filter and downsize image step 920 applies an anti-aliasing pre-filter and resizes the image downward. In a preferred embodiment, the pre-filter is a simple 2×2 "boxcar" filter, and the resize factor is 0.5×.

An update blur filter bandwidth 925 then adjusts the filter bandwidth in accordance with the smaller image size. For the case where the resize factor is 0.5×, the bandwidth can be increased by a factor of 2×. Control then returns to the bandwidth test 915.

When the bandwidth test determines that the bandwidth is larger than the threshold, then a filter image step 930 is used to convolve the background region using an appropriate blur filter. In a preferred embodiment, the blur filter is determined responsive to the bandwidth. Methods for designing blur filters to achieve a specified bandwidth are well-known in the image processing art. In some embodiments, a set of blur filters having different bandwidths are predefined and the most appropriate blur filter is selected in accordance with the required bandwidth. In some embodiments, the filter image step 930 can filter the image using an iterative approach where the image is filtered a plurality of times, where each iteration provides a portion of the desired blur.

After the image has been filtered with the blur filter, a resize image to original size step 935 is used to resize the blurred image to its original size. (If the blurred image is already at its original size, no processing is required.) For example, if the pre-filter and downsize image step 910 had been applied twice, each time downsizing the image by a resize factor of 0.5×, then the resize image to original size step 935 would resize the image by a factor of 4×. The resize image to original size step 935 can resize the image using any appropriate interpolation method such as bilinear interpolation or bicubic interpolation, both of which are well-known to those skilled in the art.

The processing shown in FIG. 17 illustrates the use of a simple nonlinear iteration method to reduce the processing required to blur the background. This exemplary process highlights the two useful concepts: filtering the image with a low-pass filter determined to provide a desired bandwidth, and applying a low-pass filter at lower resolution to increase the filter impact. Those skilled in the art will appreciate that more sophisticated approaches can be used to minimize the number of iterations.

Figure 3B:
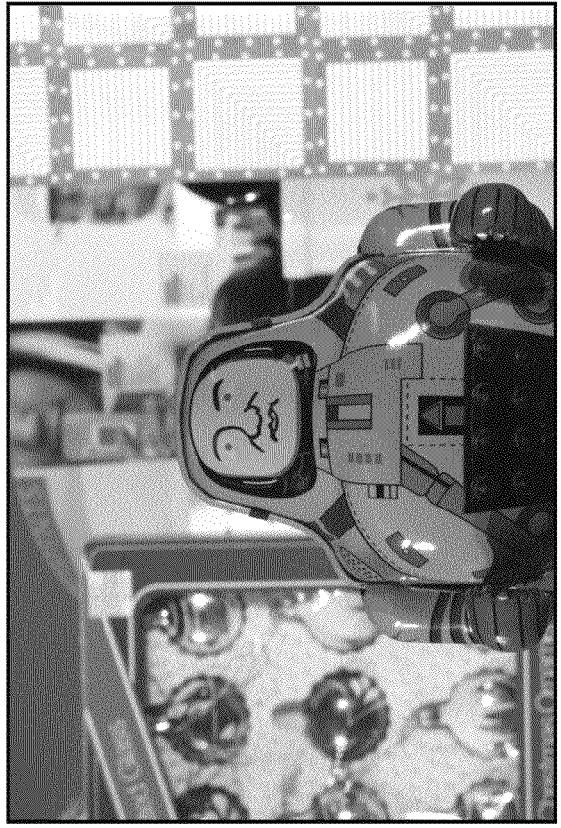
FIGS. 3A and 3B illustrate two images of the same scene captured with two different F/# settings illustrating depth-of-field effects.
Figure 5:
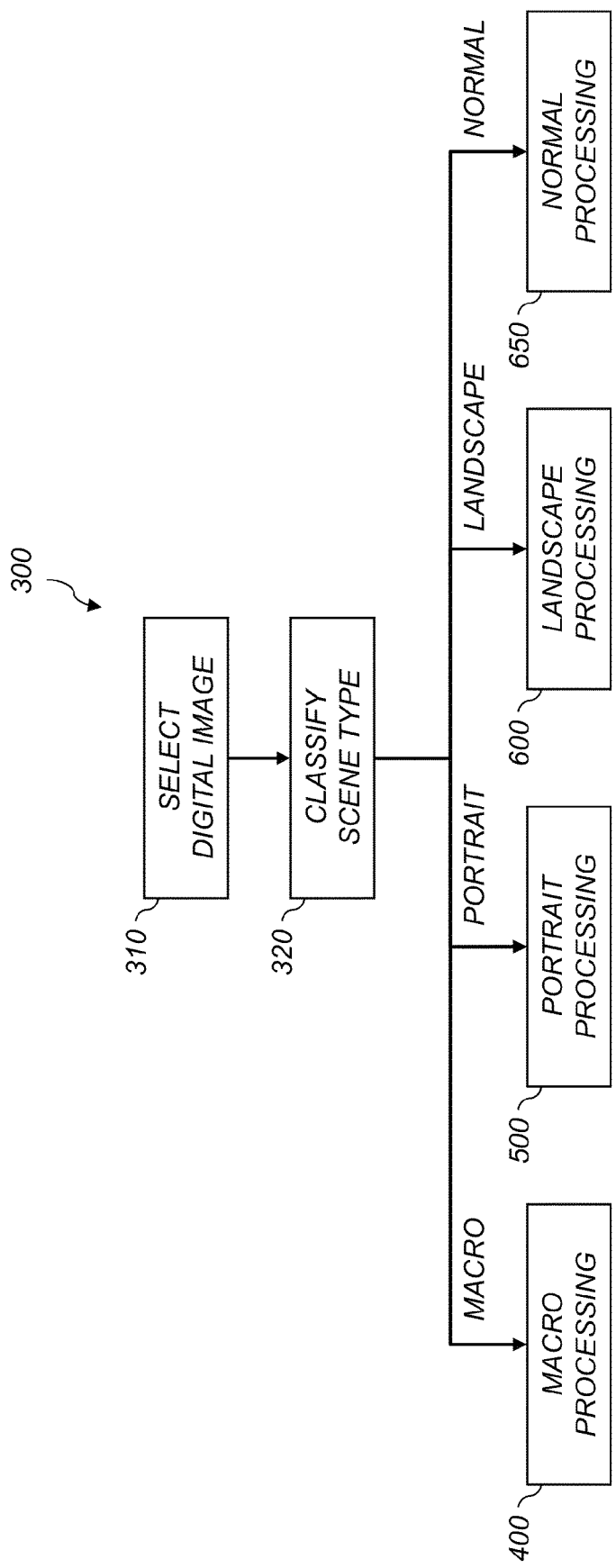
FIG. 5 is a flow diagram illustrating image processing that depends on a scene classification.

Consider the case where the exemplary high F/# digital image 195 shown in FIG. 3B is processed according to the image enhancement process 300 of FIG. 5. The high F/# digital image 195 was captured at F/32 and has a large depth of field so that both the subject and background are in focus. In this example, the classify scene type 320 classifies the high F/# digital image 195 as a portrait scene and applies the portrait processing block 500 of FIG. 7. The segment subject from background step 510 segments the digital image 195 to form a segmentation map 660 as shown in FIG. 17A. The segmentation map includes a subject region 665 and a background region 670. In this example, the subject at aim sharpness test 430 (FIG. 7) determines that the sharpness of the subject needs to be decreased slightly and the filter subject to adjust perceptual sharpness step 440 processes the subject region to produce processed subject region 690 shown in enhanced digital image 680 of FIG. 17B. The background at aim sharpness test 460 (FIG. 7) determines that the sharpness of the background region should be decreased significantly. The filter background to adjust perceptual sharpness step 470 (FIG. 7) then processes the background region to produce the processed background region 695.

Figure 3A:
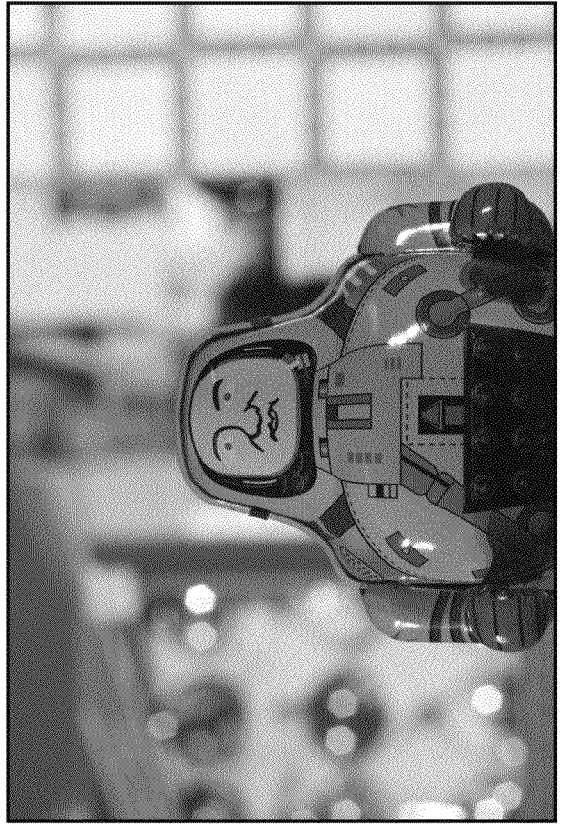
Figure 4:
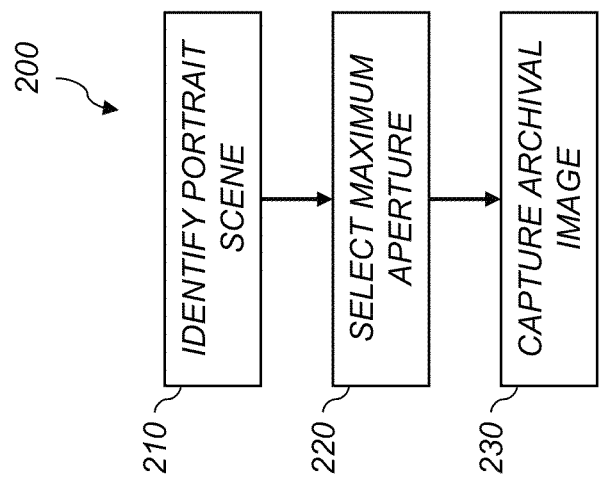
FIG. 4 is a flow diagram of a prior art process for providing an image capture with a limited depth-of-field for portrait images.
Figure 17B:
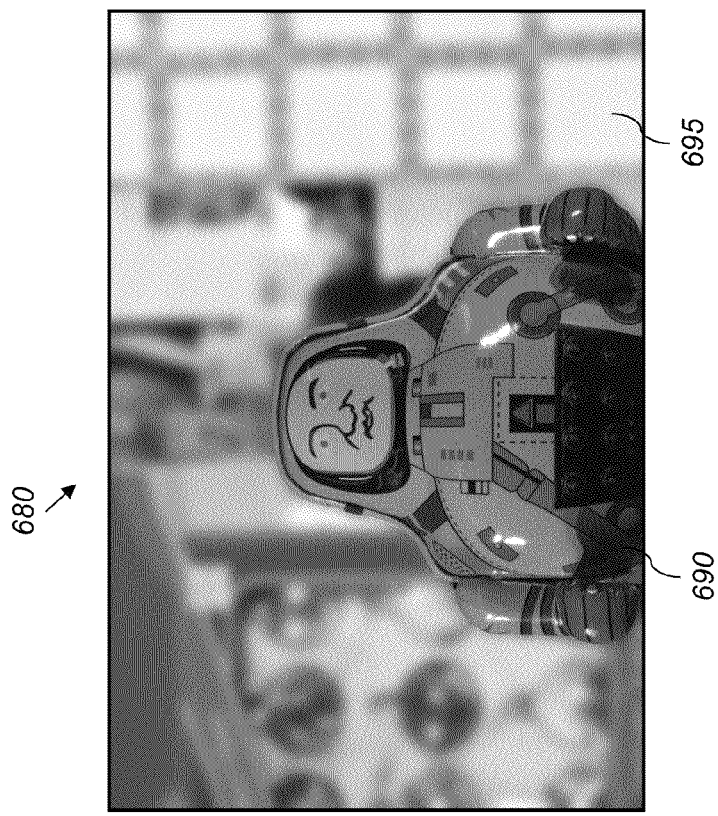
FIG. 17B illustrates an exemplary image formed by processing the digital image in FIG. 3B in accordance with the present invention.
Figure 17A:
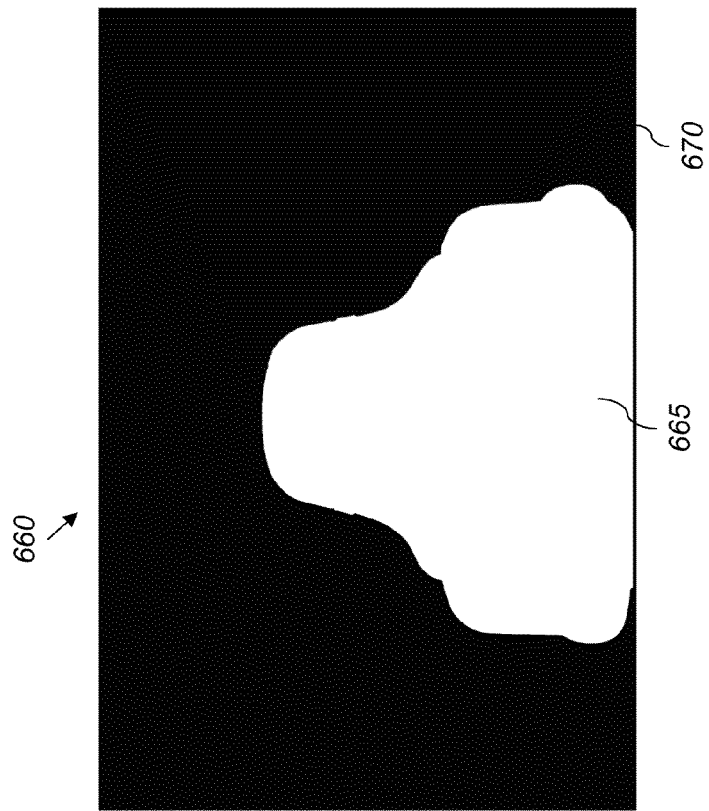
FIG. 17A illustrates an image segmentation map determined for the digital image in FIG. 3B.

Comparing the enhanced digital image 680 of FIG. 17B to the low F/# digital image 190 of FIG. 3A, it can be seen that the results closely mimic the desirable low depth-of-field image characteristics associated with capturing a portrait image using a small F/# optical system even though the input image did not exhibit these characteristics. This demonstrates that the method of the present invention can be used to provide desirable subject and background sharpness characteristics in a wide variety of applications even when the optical system/photography mode used in the digital image capture system may be constrained such that the captured image does not provide the desired results.

Figure 18:
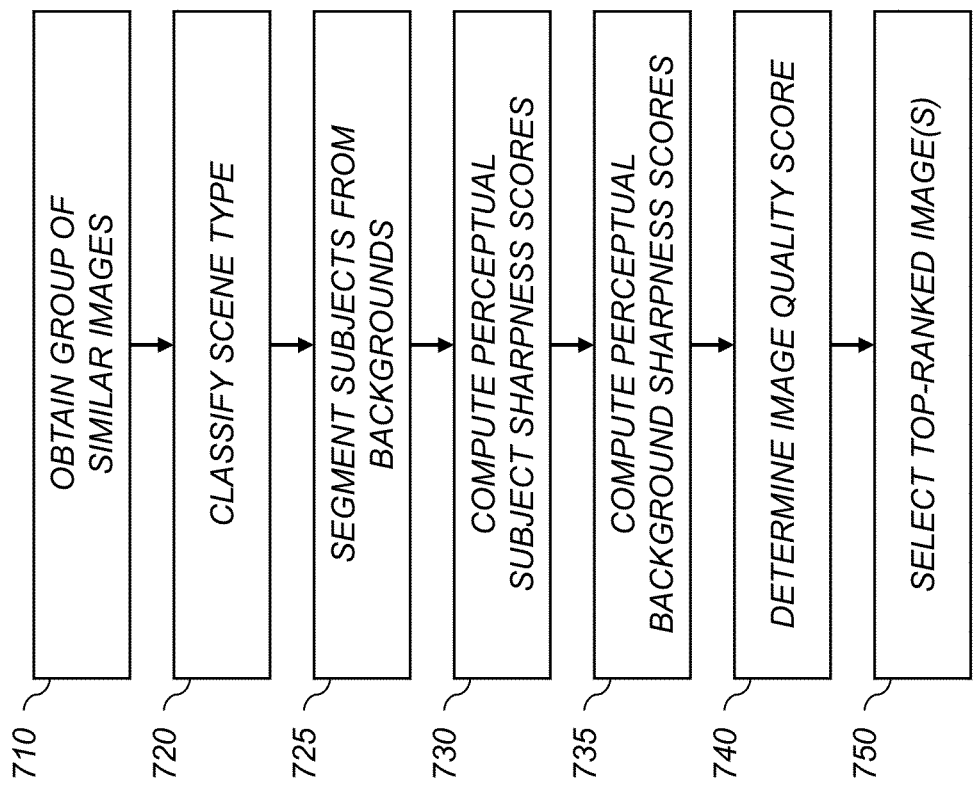
FIG. 18 is a flow diagram illustrating an alternate embodiment where subject and background perceptual sharpness are used in an image selection process.

FIG. 18 shows a flowchart for another embodiment of the present invention. In this embodiment, rather than modifying the sharpness characteristics of an input digital image, a group of images are evaluated to select the image having the most desirable sharpness characteristics.

An obtain group of similar images step 710 is used to identify a group of similar images for evaluation. The group of similar images are preferably images of the same scene, covering approximately the same field of view.

In some cases, the group of similar images is a sequence of images captured by a digital camera having an adjustable optical system, wherein each image is captured at a different setting of the optical system. For example, the optical system can have an adjustable F/#, an adjustable focus distance, an adjustable focal length, or some combination thereof. Accordingly, the group of similar images can include a series of images captured at different F/# settings to provide different levels thereby providing different levels of background blur. Similarly, the group of similar images can include a series of images captured at different focus distances, thereby changing the sharpness of objects at different distances.

In other cases, the images can be captured with a plurality of different cameras, such as from multiple photographers using their own cameras to capture images of a particular event. In some cases, the group of similar images can be manually collected from the photographers by a user and provided for input to the method of FIG. 18. In other cases, the photographers can transmit their captured images to a common storage device, such as a network server or a web site, where they can be grouped together for processing.

In some cases, the obtain group of similar images step 710 can include performing an analysis of image similarity to aid in determining a group of similar images from a larger collection of images (e.g., the images stored on a particular network server). The image similarity can be determined using any technique known in the art. One example is described in commonly-assigned U.S. Pat. No. 6,915,011 to Loui et al, entitled "Event clustering of images using foreground/background segmentation," which is incorporated herein by reference. This patent teaches a block-based comparison of images, providing a measure of similarity. This example is not limiting, and other techniques for obtaining a group of similar images can be used and combined, including various user interaction techniques.

In some cases, the group of similar images can be frames of a digital video sequence. Each of the frames may have different sharpness characteristics due to focus adjustments of the optical system, or due to motion of the camera or objects in the scene.

Once a group of similar images is obtained, a classify type step 720 is executed. This step determines the scene type for the group of similar images. Because the images are similar, they are expected to belong to the same class or scene type, a fact that can be leveraged by the classify scene type step 720. In a preferred embodiment, the scene type is determined using the same process that was described earlier with respect to the classify scene type step 320 in FIG. 5. In some embodiments, if a reliable scene type classification is determined for one of the digital images, it is assumed that this scene type will be valid for entire group of images and no further scene classification is performed. In some embodiments, if the scene type classification is less reliable, scene types can be determined for each of the images and the most commonly assigned scene type is used for the entire group of images.

After classifying the group of images, a segment subjects from backgrounds step 725 is used to segment each image into subject and background regions. In some embodiments, different segmentation processes can be used for different scene types, as was described earlier relative to the segment subject from background steps 410 and 510 in FIGS. 6 and 7, respectively. While all scenes are expected to be similar enough to share a common scene type, they are segmented independently.

After segmentation, a compute perceptual subject sharpness scores step 730 is used to estimate the perceptual sharpness of the subject regions in each of the digital images. In a preferred embodiment, this is done using the same process that was described earlier relative to the determine perceptual sharpness for subject step 420 in FIG. 10. Similarly, a compute perceptual background sharpness scores step 735 is used to estimate the perceptual sharpness of the background in each of the digital images. In a preferred embodiment, this is done using the same process that was described earlier relative to the determine perceptual sharpness for background step 425 in FIG. 12.

After obtaining subject and background sharpness scores as needed, a determine image quality score step 740 is used to determine an image quality score for each of the digital images in the group of similar images responsive to the determined subject and background sharpness scores. In a preferred embodiment, aim sharpness levels for the subject and background are defined based on the scene type, and the image quality score is determined based on differences between the determined subject and background sharpness scores and the corresponding aim sharpness levels. For example, a sharpness quality score $Q_s$ can be determined using the following equation $$Q_s = W_s(S_{s,a} - S_{s,i}) + W_b(S_{b,a} - S_{b,i}) \quad (8)$$

where $S_{s,a}$ and $S_{b,a}$ are the aim sharpness levels for the subject and background regions, respectively, $S_{s,i}$ and $S_{b,i}$ are the determined subject and background sharpness scores, respectively, and $W_s$ and $W_b$ are weighting constants that are used to weight the importance of sharpness errors for the subject and background regions. Preferably, $W_s > W_b$, reflecting the fact that the sharpness level of the subject is more critical than the sharpness level of the background.

In another embodiment, the sharpness quality score can be determined based on an aim sharpness difference between the background and the subject:

$$Q_s = W_s S_{s,i} + W_b[(S_{s,i} - S_{b,i}) - (S_{s,a} - S_{b,a})] \quad (9)$$

where $(S_{s,a}-S_{b,a})$ is the aim sharpness difference and $(S_{s,i}-S_{b,i})$ is the actual sharpness difference for the image. This approach makes the assumption that the subject should be focused as sharply as possible, and that the preferred background sharpness is defined to be a specified interval less than the subject sharpness.

In some embodiments, the image quality score can also incorporate other factors that impact image quality in addition to the sharpness. The various image quality factors can be combined in any way known in the art. In some embodiments, a weighted summation of the terms determined for the individual image quality factors is computed, wherein weighting factors are used to weight the importance of the individual factors.

In some embodiments, the image quality score includes an aesthetic quality score, which is an estimate of the aesthetic quality of the image. The aesthetic quality score can be determined using any method known in the art, such as that described in commonly-assigned U.S. Pat. No. 8,238,615, "Method for comparing photographer aesthetic quality" to Cerosaletti et al, which is incorporated herein by reference. Other techniques for estimating aesthetic quality include those described by Jiang et al. in the article entitled "Automatic aesthetic value assessment in photographic images" (Proc. IEEE International Conference on Multimedia and Expo, pp. 920-925, 2010), and those described by Li et al. in the article entitled "Aesthetic quality assessment of consumer photos with faces" (IEEE International Conference on Image Processing, pp. 3221-3224, 2010).

Finally, a select top-ranked image(s) step 750 is used to select one or more of the images having the highest image quality scores to be saved in a processor-accessible memory. As mentioned earlier, in some cases, the group of similar images is a sequence of images captured by a digital camera. In some embodiments, the sequence of images (e.g., at different F/# settings) is captured in response to a single activation of an image capture control, and the selected top-ranked is automatically stored in an archival image file. In such embodiments, the user may not even be aware that a plurality of images were captured and evaluated, but simply observes that an image with desirable sharpness characteristics is captured.

After selection of the top-ranked image, various enhancement operations can optionally be performed. In some embodiments, the selected image is enhanced using the image enhancement process 300 of FIG. 5 to further optimized the sharpness characteristics of the foreground and background. Since the sharpness characteristics of the selected image has already been processed to determine a scene classification, to segment the image into subject and background regions, and to determine corresponding sharpness scores, it will be unnecessary to repeat these analyses.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST 2 flash
4 lens
6 adjustable aperture and adjustable shutter
8 zoom and focus motor drives
10 digital camera
12 timing generator
14 image sensor
16 ASP and A/D Converter
18 buffer memory
20 processor
22 audio codec
24 microphone
26 speaker
28 firmware memory
30 image memory
32 image display
34 user controls
36 display memory
38 wired interface
40 computer
42 tilt sensor
44 video interface
46 video display
48 interface/recharger
50 wireless modem
52 radio frequency band
58 wireless network
70 Internet
72 photo service provider
90 white balance setting
95 white balance step
100 color sensor data
105 noise reduction step
110 ISO setting
115 demosaicing step
120 resolution mode setting
125 color correction step
130 color mode setting
135 tone scale correction step
140 contrast setting
145 image sharpening step
150 sharpening setting
155 image compression step
160 compression mode setting
165 file formatting step
170 metadata
175 photography mode settings
180 digital image file
185 camera settings
190 low F/# digital image
195 high F/# digital image
200 image capture process
210 identify portrait mode step
220 select maximum aperture step
230 capture archival image step
300 image enhancement process
310 select digital image step
320 classify scene type step
400 macro processing block
410 segment subject from background step
420 determine perceptual sharpness for subject step
425 determine perceptual sharpness for background step 430 subject at aim sharpness test
440 filter subject to adjust perceptual sharpness step
450 set aim sharpness for background step
460 background at aim sharpness test
470 filter background to adjust perceptual sharpness step
480 form composite archival image step
490 save archival image step
500 portrait processing block
510 segment subject from background step
600 landscape processing block
610 determine perceptual sharpness for scene step
620 scene at aim sharpness test
630 filter scene to adjust perceptual sharpness step
650 normal processing block
660 segmentation map
665 subject region
670 background region
680 enhanced digital image
690 processed subject region
695 processed background region
710 obtain group of similar images step
720 classify scene type step
725 segment subjects from backgrounds step
730 compute perceptual subject sharpness scores step
735 compute perceptual background sharpness scores step
740 determine image quality score step
750 select top-ranked image(s) step
810 extract luma channel step
820 crop image step
825 resize image step
830 build Sobel edge map step
840 mask off background region step
845 mask off subject region step
850 form edge histogram step
860 select strong edge threshold step
870 build binary edge mask step
880 median filter edge mask step
890 compute average edge value for strong subject edges step
895 compute average edge value for strong background edges step
900 sharpen background test
905 sharpen background step
910 determine filter bandwidth step
915 bandwidth test
920 pre-filter and downsize image step
925 update bandwidth step
930 filter image step
935 resize image to original size step

The invention claimed is:

1. A method for providing a digital image having controlled sharpness characteristics, the method being implemented at least in part by a data processing system, comprising:

receiving a set of candidate digital images of a common scene, each digital image having different sharpness characteristics;

applying an image segmentation process to segment each of the candidate digital images into a subject region and a background region;

for each candidate digital image automatically analyzing the subject region to determine an associated subject sharpness level and automatically analyzing the background region to determine an associated background sharpness level;

defining an aim subject sharpness level for the subject region and defining an aim background sharpness level for the background region;

selecting an output digital image having desirable sharpness characteristics from the set of candidate digital images responsive to the aim subject sharpness level and the aim background sharpness level and to the determined subject sharpness level and the determined background sharpness level associated with each candidate digital image; and storing an indication of the output digital image in a processor-accessible memory.

2. The method of claim 1 further including adjusting the sharpness of the subject region in the output digital image responsive to the associated subject sharpness level and the aim subject sharpness level, or adjusting the sharpness of the background region in the output digital image responsive to the associated background sharpness level and the aim background sharpness level.

3. The method of claim 2 wherein the sharpness of the subject region is adjusted by applying an unsharp masking operation, and wherein one or more parameters used in the unsharp masking operation are adjusted responsive to the subject sharpness level and the aim subject sharpness level.

4. The method of claim 3 wherein the one or more parameters that are adjusted include a gain parameter or filter coefficients in a convolution kernel.

5. The method of claim 2 wherein the sharpness of the background region is adjusted to blur the background, and wherein the adjustment of the sharpness of the background region to includes iteratively applying low-pass filtering and resizing operations until an appropriate amount of blur has been achieved.

6. The method of claim 1 wherein the candidate digital images were captured using an image capture device having an adjustable optical system, and wherein the different sharpness characteristics of the candidate digital images are provided by adjusting the adjustable optical system.

7. The method of claim 6 wherein the adjustable optical system is adjusted by adjusting an aperture setting or a focus distance.

8. The method of claim 1 wherein the aim subject sharpness level and the aim background sharpness level are defined responsive to a scene classification.

9. The method of claim 8 wherein the scene classification is selected by a user by means of a user interface.

10. The method of claim 8 wherein the scene classification is determined by automatically analyzing the candidate digital images or responsive to metadata associated with the candidate digital images.

11. The method of claim 8 wherein the aim subject sharpness level and the aim background sharpness level are defined to provide a predetermined sharpness difference between the subject and the background, and wherein the predetermined sharpness difference is responsive to the scene classification.

12. The method of claim 1 wherein the aim subject sharpness level and the aim background sharpness level are defined responsive to a user preference study.

13. The method of claim 1 wherein the automatic analysis of the subject region or the background region to determine the corresponding subject sharpness level or background sharpness level includes:

determining an edge map of edges in the subject region or background region, wherein the edge map has edge values indicating edge strength;

identifying strong edges having edge values that exceed a strong edge threshold; and determining the corresponding subject sharpness level or background level by computing an average of the edge values for the identified strong edges.

14. The method of claim 13 wherein the strong edge threshold is determined based on a edge value histogram, the edge value histogram being a histogram of the edge values in the corresponding subject region or background region.

15. The method of claim 14 wherein the strong edge threshold corresponds to a predefined percentile of the edge value histogram.

16. The method of claim 1 wherein the set of candidate digital images were captured by an image capture device, and wherein the process of selecting the output digital image is performed using a data processor in the image capture device.

17. The method of claim 1 wherein the set of candidate digital images includes digital images that were captured using a plurality of different image capture devices.

18. The method of claim 1 wherein the set of candidate digital images are frames of a digital video.

19. A digital camera system providing digital images having controlled sharpness characteristics, comprising:
- an image sensor for capturing a digital image;
- an adjustable optical system for forming an image of a scene onto the image sensor, the adjustable optical system having an adjustable aperture setting or an adjustable focus distance;
- a data processing system;
- a storage memory for storing captured images; and
- a program memory communicatively connected to the data processing system and storing instructions configured to cause the data processing system to implement a method for providing a digital image having controlled sharpness characteristics, wherein the method includes:
  - capturing a set of candidate digital images of a scene, wherein the set of candidate digital images includes candidate digital images captured with different settings of the adjustable optical system;
  - applying an image segmentation process to segment each of the candidate digital images into a subject region and a background region;
  - for each candidate digital image automatically analyzing the subject region to determine an associated subject sharpness level and automatically analyzing the background region to determine an associated background sharpness level;
  - defining an aim subject sharpness level for the subject region and defining an aim background sharpness level for the background region;
  - selecting an output digital image having desirable sharpness characteristics from the set of candidate digital images responsive to the aim subject sharpness level and the aim background sharpness level and to the determined subject sharpness level and the determined background sharpness level associated with each candidate digital image; and
  - storing the selected output digital image in the storage memory.

* * * * *